United States Patent
Lee et al.

(10) Patent No.: US 11,966,243 B2
(45) Date of Patent: Apr. 23, 2024

(54) POWER FACTOR ADJUSTMENT METHOD AND APPARATUS IN WAVEGUIDE CIRCUIT OR TRANSMISSION LINE CIRCUIT, AND POWER GENERATING TRANSMISSION LINE SYSTEM USING THE SAME

(71) Applicant: PHASETOWN, LLC, Daejeon (KR)

(72) Inventors: Won Don Lee, Daejeon (KR); Hijung Chai, Daejeon (KR)

(73) Assignee: PHASETOWN, LLC, Daejeon (KR)

( * ) Notice: Subject to any disclaimer, the term of this patent is extended or adjusted under 35 U.S.C. 154(b) by 0 days.

(21) Appl. No.: 17/778,213

(22) PCT Filed: Mar. 27, 2020

(86) PCT No.: PCT/KR2020/004209
§ 371 (c)(1),
(2) Date: May 19, 2022

(87) PCT Pub. No.: WO2021/100979
PCT Pub. Date: May 27, 2021

(65) Prior Publication Data
US 2024/0004414 A1    Jan. 4, 2024

(30) Foreign Application Priority Data
Nov. 22, 2019   (WO) ............... PCT/KR2019/016134

(51) Int. Cl.
*G05F 1/70* (2006.01)
*H02J 3/16* (2006.01)
*H02J 3/20* (2006.01)

(52) U.S. Cl.
CPC ............... *G05F 1/70* (2013.01); *H02J 3/16* (2013.01); *H02J 3/20* (2013.01)

(58) Field of Classification Search
CPC ............... G05F 1/70; H02J 3/16; H02J 3/20
See application file for complete search history.

(56) References Cited

U.S. PATENT DOCUMENTS 5,642,007 A   6/1997  Gyugyi et al.
7,733,677 B2 * 6/2010  Cheng ............... H02M 1/4233
                                              363/127

(Continued)

FOREIGN PATENT DOCUMENTS

EP   1610435 A2   12/2005
GB   1133091 A    11/1968

(Continued)

OTHER PUBLICATIONS

International Search Report and Written Opinion, dated Aug. 21, 2020, by the Korean Intellectual Property Office in International Application No. PCT/KR2019/016134. (7 Pages).

(Continued)

*Primary Examiner* — Jared Fureman
*Assistant Examiner* — Michael J Warmflash
(74) *Attorney, Agent, or Firm* — Panitch Schwarze Belisario & Nadel LLP

(57) ABSTRACT

This invention relates to a method and apparatus for power factor adjustment in a waveguide circuit or a transmission line circuit. In this invention, it is shown that, in a waveguide circuit or a transmission line circuit, the power supplied by the source and the impedance can be adjusted by controlling the amount of the phase change of the signal when it propagates through the (equivalent) transmission line once the medium, the structure, and the load of the waveguide circuit or the transmission line circuit are chosen. It is also shown that, by choosing an appropriate frequency, transmission line, and load, one can achieve the negative power factor of the (equivalent) transmission line circuit, and also make the power delivered from the source be lesser than that consumed at the load.

14 Claims, 11 Drawing Sheets

(56) References Cited

U.S. PATENT DOCUMENTS

| | | | |
|---|---|---|---|
| 10,180,696 B2 | 1/2019 | Das et al. | |
| 2017/0170664 A1 | 6/2017 | Minegishi et al. | |
| 2020/0336094 A1* | 10/2020 | Lee | H01F 27/24 |
| 2023/0282412 A1* | 9/2023 | Lee | H02M 3/33573 |
| | | | 323/205 |

FOREIGN PATENT DOCUMENTS

| | | |
|---|---|---|
| JP | 85899225 A | 6/1983 |
| JP | 2002354670 A | 12/2002 |
| JP | 2011524156 A | 8/2011 |
| WO | 9605642 A1 | 2/1996 |
| WO | 2009140218 A1 | 11/2009 |
| WO | 2012020475 A1 | 2/2012 |
| WO | 2019117320 A1 | 6/2019 |
| WO | 2019117329 A1 | 6/2019 |

OTHER PUBLICATIONS

Acha, E., et al., "Single-phase full-bridge VSC", Power Electronic Control in Electrical Systems, 2002, Sec. 6.3.2, p. 201, Newnes Power Engineering Series, Newwnes. (2 pages).

Banerjee, Dean, "Basic PPL Overview", PPL Performance, Simulation, and Design, 5th Edition, May 2017, pp. 1-8, Dog Ear publishing, LLC. (14 pages).

Brews, John R., "Transmission Line Models for Lossy Waveguide Interconnections in VLSI", IEEE Transactions on Electron Devices, Sep. 1986, pp. 1356-1365, vol. ED-33, No. 9. (10 pages).

Honda, Jun, et al., Application Note AN-1071:Class D Audio Amplifier Basics, Feb. 8, 2005, pp. 1-14, International Rectifier, El Segundo, California. (14 pages).

International Search Report (PCT/ISA/210) and Written Opinion (PCT/ISA/237) dated Aug. 21, 2020, by the Korean Intellectual Property Office as the International Searching Authority for International Application No. PCT/KR2020/004209. (8 pages).

Kamil, Mohammad, Switch Mode Power Supply (SMPS) Topologies (Part I), Microchip AN114, Sep. 10, 2007, pp. 1-48, DS01114A, Microchip Technology, Inc. (48 pages).

Marcuvitz, N. "Uniform Transmission Lines", Waveguide Handbook, 1st Edition, 1951, p. 27, Sec. 1-6, McGraw-Hill Book Company, Inc, New York, New York. (2 pages).

Marks, Roger B, et al., "A General Waveguide Circuit Theory", Journal of Research of the National Institute of Standards and Technology, Sep.-Oct. 1992, pp. 533-562, vol. 97, No. 5. (30 pages).

Orfanidis, Sophocles J., "Propagation Matrices", Electromagnetic Waves and Antennas, Rutgers University, 1999-2016, pp. 155-156, http://eceweb1.rutgers.edu/~orfanidi/ewa/, The MathWorks, Inc. (2 pages).

Rao, Nannapaneni Narayana, "Wave Propagation in Material Media", Fundamentals of Electromagnetics for Electrical Computer Engineering, [date unknown], pp. 141-185, Chapter 5, Illinois ECE Series. (46 pages).

Rao, Nannapaneni Narayana, "Wave Propagation in Material Media", Fundamentals of Electromagnetics for Electrical Computer Engineering, [date unknown], pp. 290-338, Chapter 8, Illinois ECE Series. (50 pages).

Notice of Reasons for Refusal, dated May 17, 2023, issued in corresponding Japanese Patent Application No. 2022-529475, 20 pgs.

Extended European Search Report, dated Mar. 14, 2024, issued in European Application No. 20890794.9-1202, 7 pages.

* cited by examiner

[Figure 1]
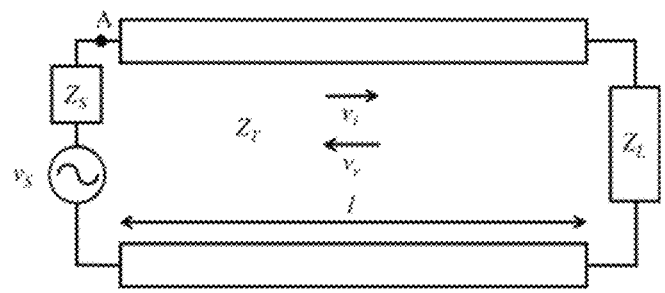
[Figure 2]
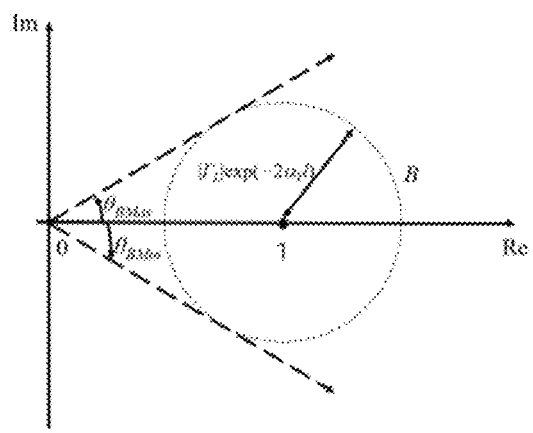
[Figure 3]
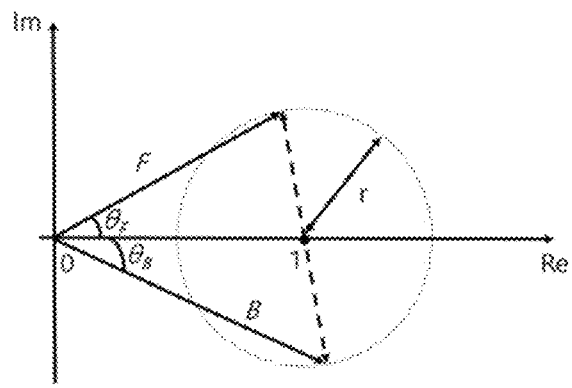

[Figure 4]
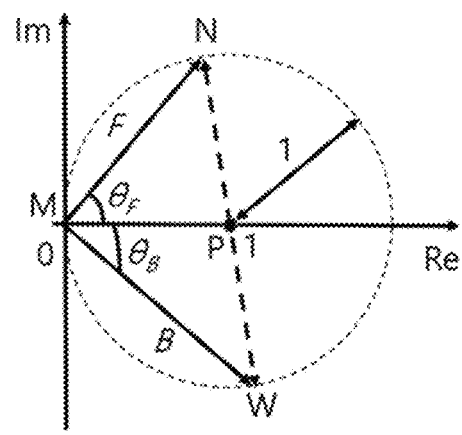
[Figure 5]
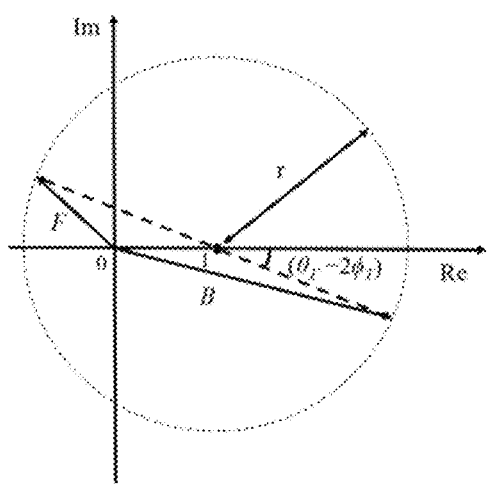
[Figure 6]
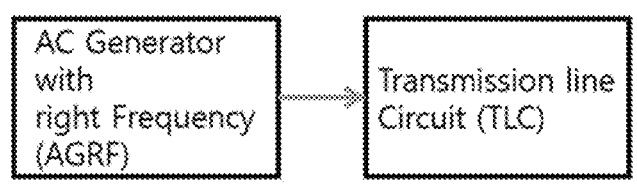

[Figure 7]
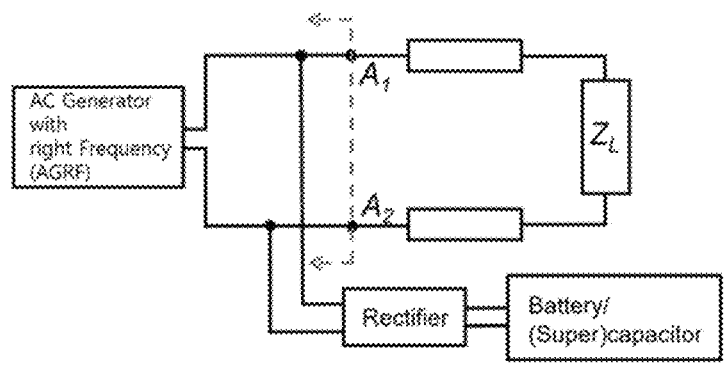
[Figure 8]
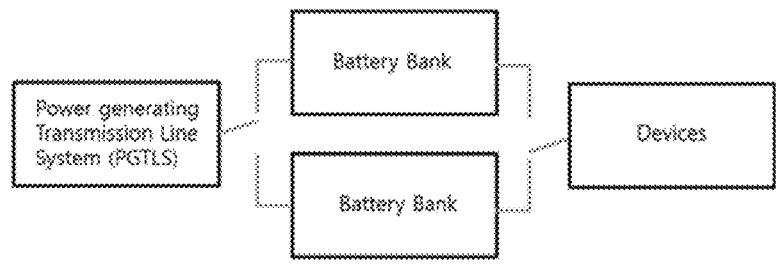
[Figure 9]
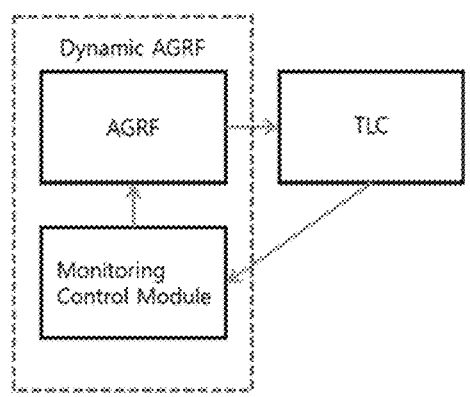

[Figure 10]
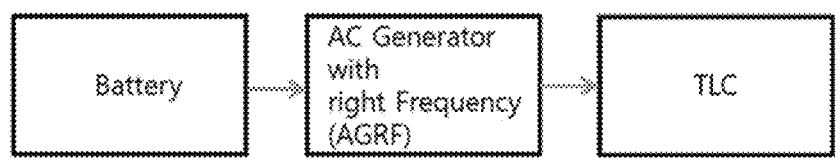
[Figure 11]
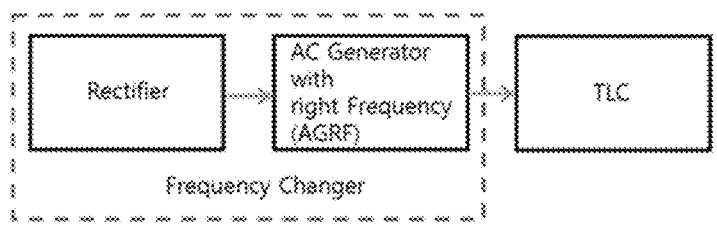
[Figure 12]
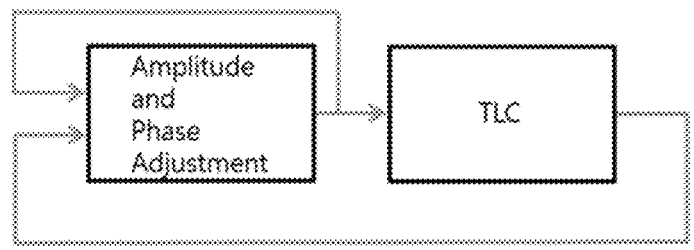
[Figure 13]
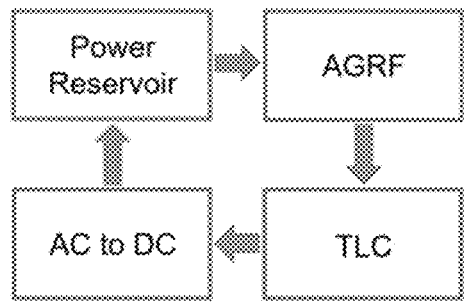

[Figure 14]
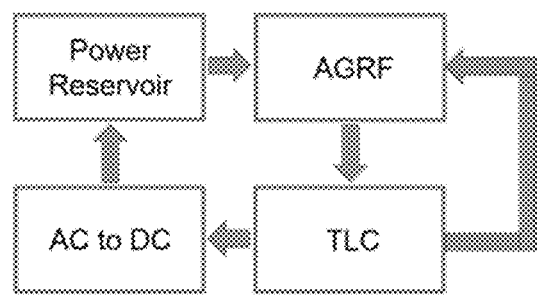
[Figure 15]
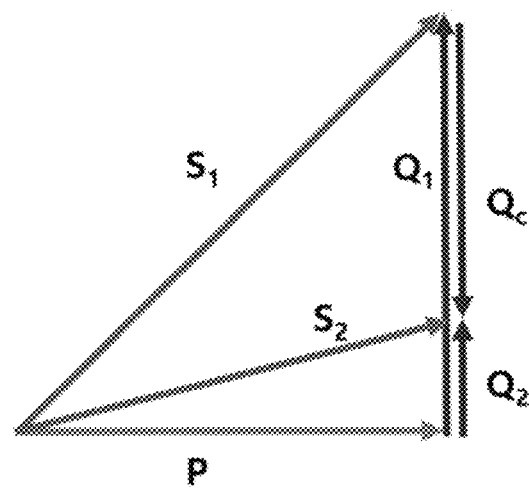

[Figure 16]
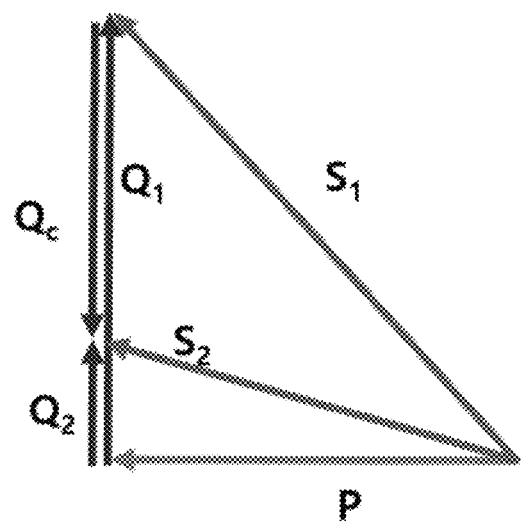
[Figure 17]
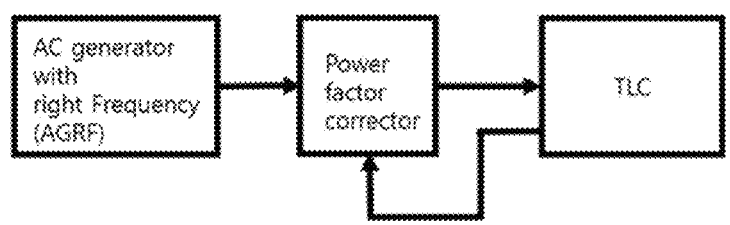
[Figure 18]
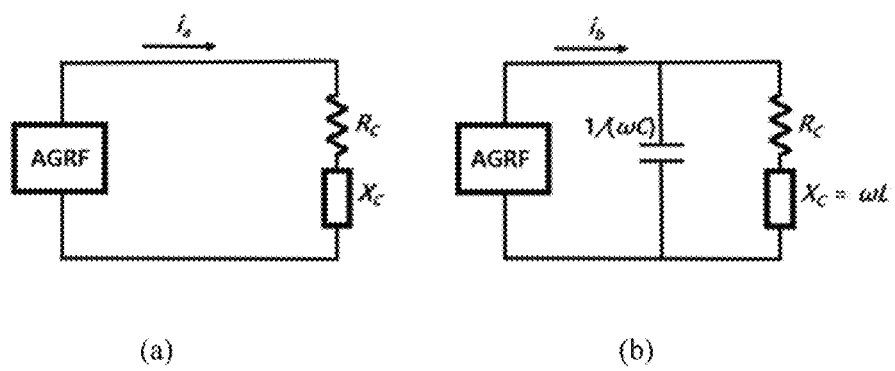
(a)          (b)

[Figure 19]
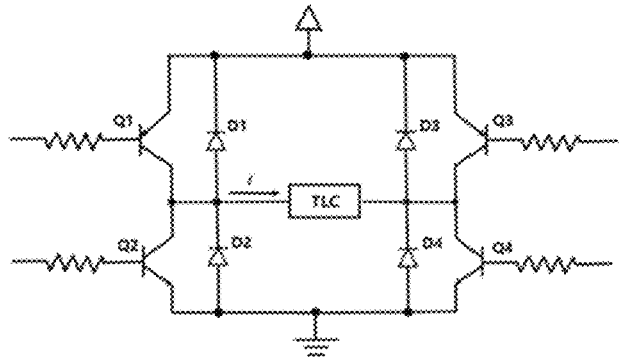
[Figure 20]
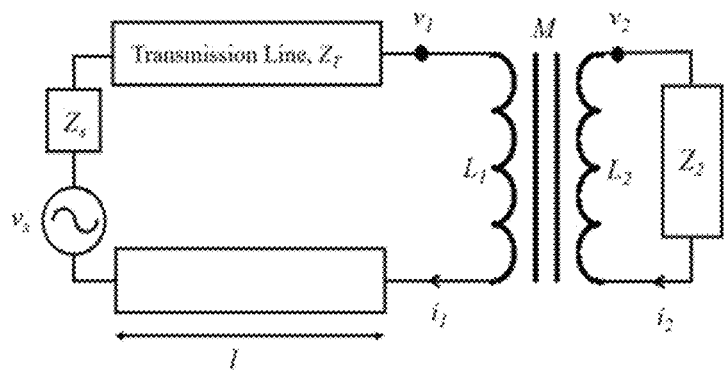
[Figure 21]
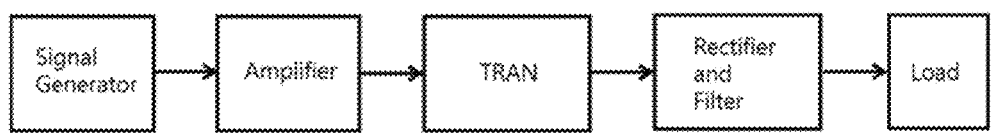
[Figure 22]
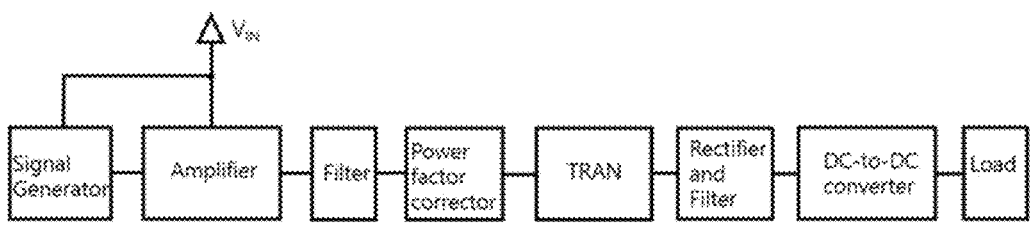

[Figure 23]
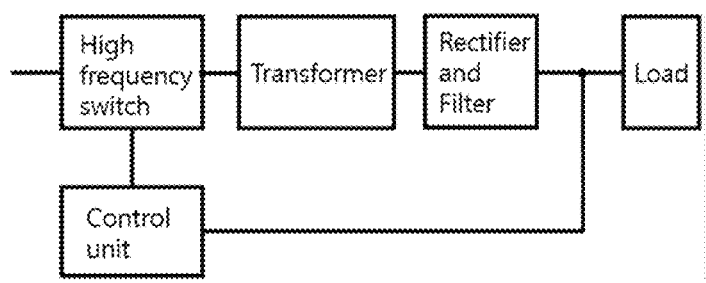
[Figure 24]
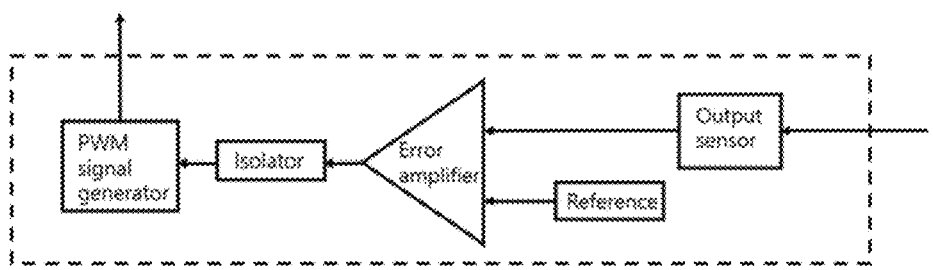
[Figure 25]
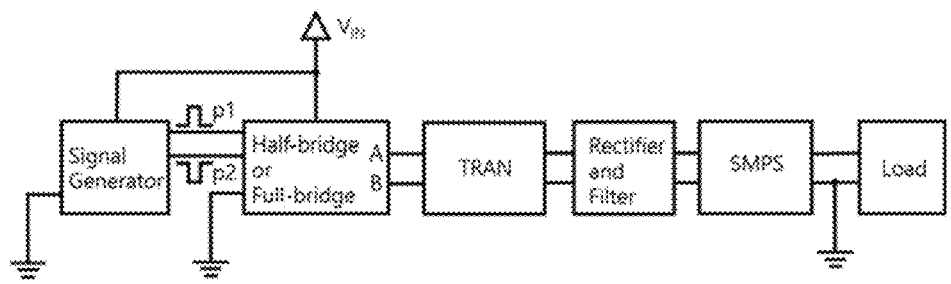

[Figure 26]
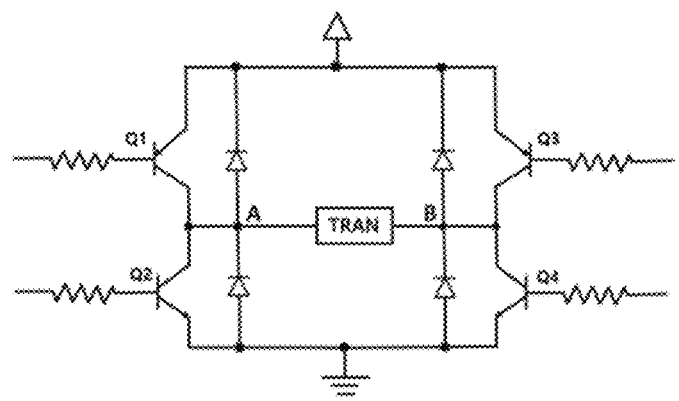
[Figure 27]
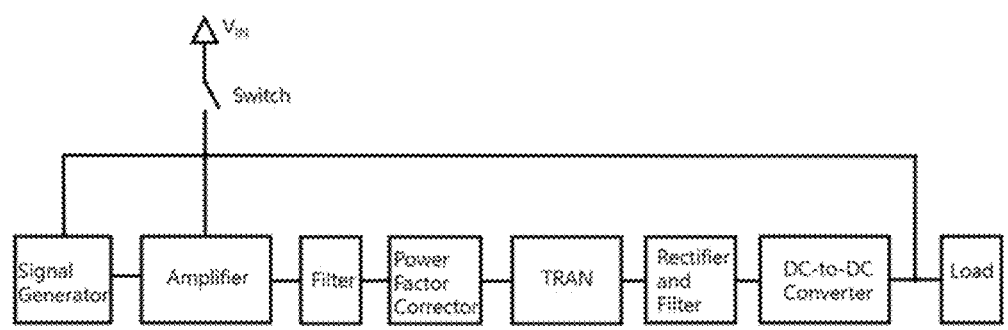
[Figure 28]
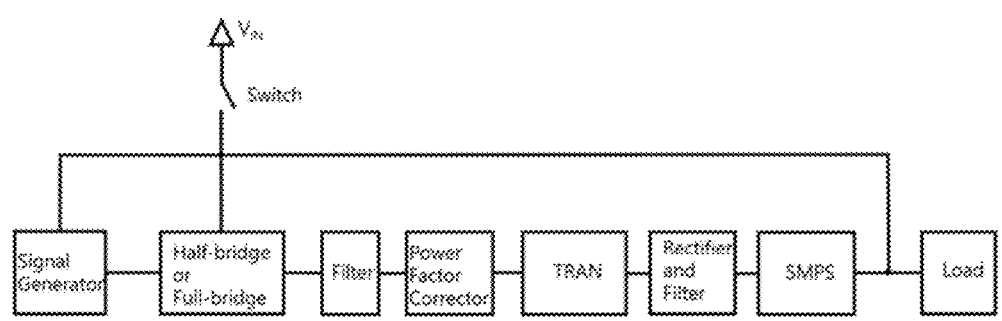

[Figure 29]
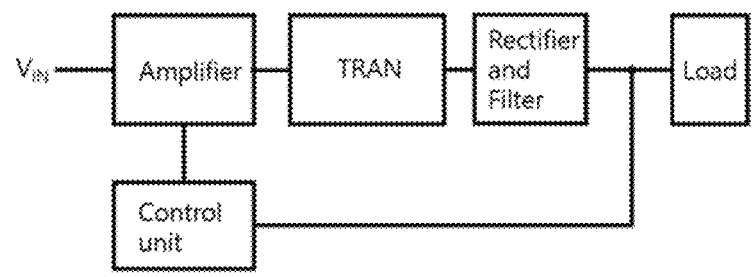
[Figure 30]
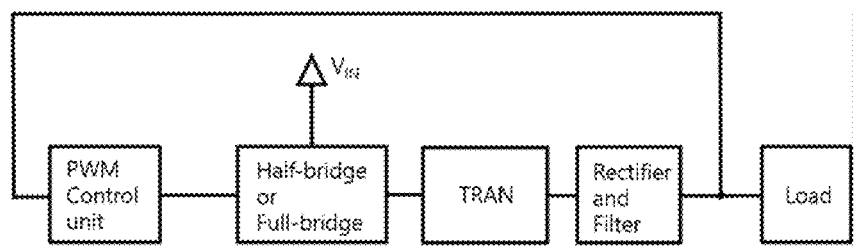
[Figure 31]
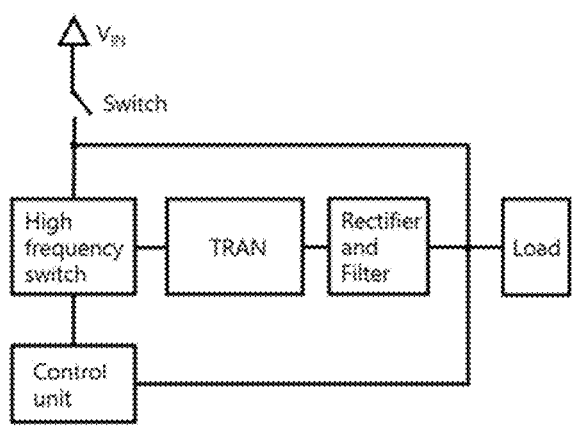

[Figure 32]
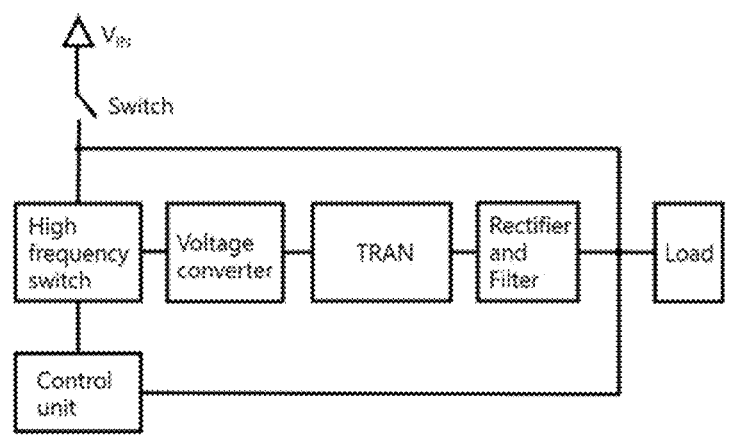
[Figure 33]
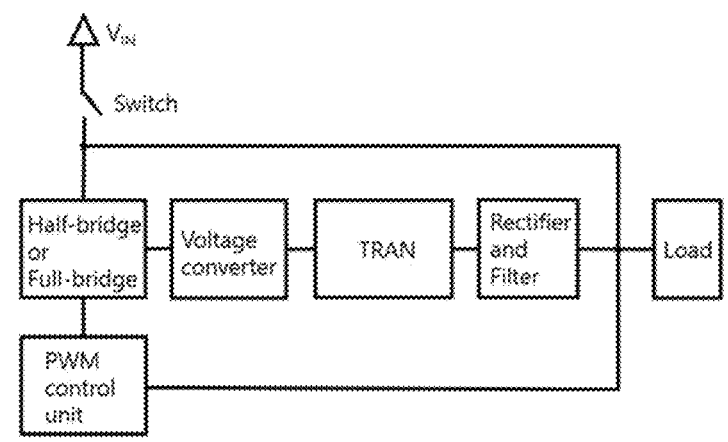

POWER FACTOR ADJUSTMENT METHOD AND APPARATUS IN WAVEGUIDE CIRCUIT OR TRANSMISSION LINE CIRCUIT, AND POWER GENERATING TRANSMISSION LINE SYSTEM USING THE SAME

TECHNICAL FIELD

One or more embodiments relate to a method and apparatus for power factor adjustment in a waveguide circuit or a transmission line circuit, and a power generating transmission line system using the power factor adjustment.

BACKGROUND ART

Waveguides are the structure through which the electromagnetic wave propagates. An example of the waveguide that is present in the nature is the space between the surface of the earth and the ionosphere generating the Schumann resonance. Interconnection lines such as microstrip, triplate, and stripline used in VLSI are also examples of waveguide.

DISCLOSURE

Technical Problem

One or more embodiments include a method and apparatus for adjusting power factor in a waveguide circuit or in a transmission line circuit by controlling the amount of the phase change of the signal when it propagates through the waveguide or the transmission line, and a power generating transmission line system using the power factor adjustment.

Technical Solution

According to one or more embodiments, a power generating transmission line system consists of: A transmission line circuit or a waveguide circuit which can be converted to an equivalent transmission line circuit; and an AGRF configured to generate an alternating voltage wave and to control power supplied by a source by adjusting a relative phase based on a frequency of the alternating voltage wave, wherein the relative phase is a magnitude of a phase change that the alternating voltage wave undergoes in a waveguide or a transmission line,
wherein a power factor corrector is configured to control a power factor at a front-end of the waveguide circuit or the transmission line circuit using one or more components located in the waveguide circuit or the transmission line circuit,
wherein power supplied by the source of the (equivalent) transmission line circuit is determined by a characteristic impedance of the (equivalent) transmission line, an impedance of a load, the relative phase, an attenuation of the alternating voltage wave when the alternating voltage wave propagates through a medium of the waveguide or the transmission line, and an amplitude of the alternating voltage wave transmitted from the source,
wherein an impedance of the (equivalent) transmission line circuit is determined by a characteristic impedance of the (equivalent) transmission line, an impedance of the load, the relative phase, and an attenuation of the alternating voltage wave when the alternating voltage wave propagates through a medium of the waveguide or the transmission line,
wherein the relative phase is controlled by the frequency and/or a length of the waveguide or the transmission line, and/or a propagation speed of the alternating voltage wave in the medium of the waveguide or the transmission line,
wherein the power factor corrector controls the power factor at the front-end of the waveguide circuit or the transmission line circuit to be (close to) −1 when an impedance of the circuit is placed in second quadrant or third quadrant of a complex plane of the impedance, or to be (close to) 1 when the impedance of the circuit is placed in first or fourth quadrant, or to be 0 when a resistance of the impedance of the circuit is zero, by minimizing a magnitude of a reactive power,
wherein a monitoring control module is configured to control a power delivered to the load by monitoring a change of the impedance of the load,
wherein the alternating voltage wave comprises one or more frequency components and the AGRF adjusts one or more relative phases based on the one or more frequency components of the alternating voltage wave.

According to one or more embodiments, a power factor adjustment method consists of: generating, by an AGRF, an alternating voltage wave; and controlling, by the AGRF, power supplied by a source by adjusting a relative phase based on a frequency of the alternating voltage wave, wherein the relative phase is a magnitude of a phase change that the alternating voltage wave undergoes in a waveguide or a transmission line,
wherein controlling, by a power factor corrector, a power factor at a front-end of a waveguide circuit or a transmission line circuit using one or more components located in the waveguide circuit or the transmission line circuit.
wherein the relative phase is controlled by the frequency and/or a length of the waveguide or the transmission line, and/or a propagation speed of the alternating voltage wave in the medium of the waveguide or the transmission line.
wherein controlling, by the power factor corrector, the power factor at the front-end of the waveguide circuit or the transmission line circuit to be (close to) −1 when an impedance of the circuit is placed in second quadrant or third quadrant of a complex plane of the impedance, or to be (close to) 1 when the impedance of the circuit is placed in first or fourth quadrant, or to be 0 when a resistance of the impedance of the circuit is zero, by minimizing a magnitude of a reactive power.
wherein monitoring, by a monitoring control module, a change of the impedance of the load; and controlling, by the AGRF, the relative phase as the load changes dynamically.

According to one or more embodiments, a power control method of a power generating transmission line system, the method comprising: monitoring, by a monitoring control module, a change of an impedance of a load; and controlling, by the monitoring control module, a power delivered to the load according to the change of the impedance of the load, wherein the power delivered to the load is controlled through a relative phase by a change of a frequency, pulse-width modulation, or pulse-frequency.

Advantageous Effects

According to the present disclosure, the power supplied by the source and the impedance of the waveguide circuit or the (equivalent) transmission line circuit can be adjusted by controlling the amount of the phase change of the signal when it propagates through the (equivalent) transmission line once the medium, the structure, and the load of the waveguide circuit or the (equivalent) transmission line circuit are chosen. Also, one can achieve the negative power factor of the (equivalent) transmission line circuit by choosing an appropriate frequency, transmission line, and load, and also make the power delivered from the source be lesser than that consumed at the load.

DESCRIPTION OF DRAWINGS

FIG. 1 shows a transmission line circuit.

FIG. 2 shows the numerator of the impedance Z(-l) represented in the complex plane.

FIG. 3 shows the factors of the impedance Z(-l) represented in the complex plane.

FIG. 4 shows the factors of the impedance Z(-l) represented in the complex plane when (r=1).

FIG. 5 shows the factors of the impedance Z(-l) represented in the complex plane when (r>1).

FIG. 6 shows a power generating transmission line system (PGTLS).

FIG. 7 shows an example a PGTLS with the load at source side also.

FIG. 8 shows a switching system to charge a battery bank. The devices are powered by the battery bank not being charged by the PGTLS.

FIG. 9 shows a PGTLS with a dynamic AGRF.

FIG. 10 shows a long-life battery system.

FIG. 11 shows a system that consumes low power. The example uses a rectifier as a part of the circuit to change the frequency.

FIG. 12 shows a self-sustaining system without a power reservoir.

FIG. 13 shows a self-sustaining system with a power reservoir.

FIG. 14 shows a self-sustaining system with a power reservoir with the monitoring control module.

FIG. 15 shows a power triangle.

FIG. 16 shows a power triangle in case when the power factor is negative.

FIG. 17 shows an example of a PGTLS having a power factor corrector.

FIGS. 18 (a) and (b) show an equivalent circuit of a PGTLS.

FIG. 19 shows a PGTLS with switching part of the AGRF in the form of H-bridge.

FIG. 20 shows a transmission line circuit with a transformer circuit as the load.

FIG. 21 shows a block diagram of a power generating transmission line system (PGTLS).

FIG. 22 shows a block diagram of a PGTLS without feedback.

FIG. 23 shows a block diagram of an SMPS with a transformer.

FIG. 24 shows a block diagram of a PWM control unit of an SMPS using pulse-width modulation (PWM).

FIG. 25 shows an example of a block diagram of a PGTLS without feedback with a half-bridge or a full-bridge as the amplifier and with an SMPS as the DC-to-DC converter.

FIG. 26 shows a full-bridge connected to a TRAN.

FIG. 27 shows a block diagram of a PGTLS with feedback.

FIG. 28 shows an example of a block diagram of a PGTLS with feedback with a half-bridge or a full-bridge as the amplifier and with an SMPS as the DC-to-DC converter.

FIG. 29 shows a simplified block diagram of a PGTLS without feedback.

FIG. 30 shows a simplified block diagram of a PGTLS without feedback that uses a half-bridge or a full-bridge amplifier.

FIG. 31 shows a simplified block diagram of a PGTLS with feedback.

FIG. 32 shows a simplified block diagram of a PGTLS with feedback with a voltage converter.

FIG. 33 shows a simplified block diagram of a PGTLS with feedback with a half-bridge or a full-bridge amplifier.

MODE FOR INVENTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

In the document of PCT international patent application #PCT/KR2017/014540, the method to adjust the power factor by controlling the phase change in a transformer circuit is described. This invention is similar to it, but deals not with a transformer circuit, but with a waveguide circuit and a transmission line circuit. (Reference 1: Won Don Lee, Hijung Chai, and Aquila Hwan Lee, Power factor adjustment method and apparatus through the phase control, PCT International application #: PCT/KR2017/014540.)

To find the exact solution for the electric and the magnetic fields, Maxwell's equations should be solved. Instead of solving Maxwell's equations in waveguide analysis, the transmission lines are used to model the waveguides. The waveguide and the transmission line are for conveying waves and sometimes used interchangeably. In this invention, we differentiate them as follows unless otherwise specified: in a waveguide, it is the electromagnetic wave of the electric and the magnetic fields that propagates, while in a transmission line, what propagate are the waves of the voltage and the current, although, in reality, the electromagnetic wave propagates in a physical transmission line also. Note that, in the analysis of the transmission line circuit, however, the voltage and the current waves are used rather than the electric and the magnetic fields. Since it is easier to deal with the voltage and the current waves, waveguide circuits are converted to an equivalent transmission line circuit to be analyzed. As a waveguide circuit can be transformed to its equivalent transmission line circuit and can be analyzed using the voltage and the current waves, the transmission line circuits in this invention includes the waveguide circuits which are converted to equivalent transmission line circuits.

In a transmission line model, the parameters R, L, G, and C are used which are resistance, inductance, conductance, and capacitance per unit length, respectively. To model a waveguide by the transmission line circuit, we need to find exact values of the parameters mentioned above.

When there is no loss, the fields in the waveguide can be translated to the waves in the transmission line, and the parameters in the transmission line can be derived from the dimension and the medium parameters of the waveguide. When the loss is significant, the parameters in the equivalent transmission line cannot be converted from the waveguide easily, and the voltage and the current become rather abstract and cannot be interpreted in a simple manner. Therefore, the method to correctly define the parameters of the equivalent transmission line of the waveguide becomes important.

Consider a uniform waveguide which has cross sections traverse to the direction of the wave propagation equal in shape and in size. Let the z-axis be the transmission direction which is also the waveguide axis. Let the permittivity and the permeability are isotropic. Also only a single mode is allowed to propagate in the forward and backward directions.

When there is no coupling between the transverse and the longitudinal components in the permittivity and the permeability, then the result derived here can be extended to the anisotropic case. (Reference 2: Roger B. Marks and Dylan F. Williams, A general waveguide circuit theory, Journal of Research of NIST, September-October 1992, Vol. 97, No. 5: pp. 533-562.) When there are more than a single mode propagating in the waveguide, there is a set of parameters of the corresponding equivalent transmission line for each mode.

When converting a waveguide to an equivalent transmission line, two parameters from the waveguide are chosen to be the same as those in the transmission line: the propagation constant, and the power. (Reference 3: John R. Brews, Transmission line models for lossy waveguide interconnections in VLSI, IEEE Transactions on Electron Devices, Vol. ED-33, No. 9, September 1986: pp. 1356-1365.)

The connection between the waveguide and the equivalent transmission line is briefly described below.

As there is always an equivalent transmission line corresponding to a given waveguide, finding new results in the transmission line can be directly applied to the waveguide. Finding new results about the power relation in a transmission line model does not, however, restrict applying those to a high frequency waveguide only. The findings can be applied to all the possible waveguides or transmission lines. It is true because the waveguide and the equivalent transmission line are assumed to have the same power, although the voltage and the current become abstract at high frequencies.

The dependence on z of the voltage in the equivalent transmission line is the same as that of the transverse electric field. Likewise, the dependence on z of the current in the equivalent transmission line is the same as that of the transverse magnetic field.

A forward mode field has a factor of $\exp(-\gamma z)$, where $\gamma$ is the propagation constant and is described as:

$$\gamma = \alpha + j\beta, \tag{Eq. 1}$$

where $\alpha$ and $\beta$ are the attenuation constant and the phase constant, respectively.

As already mentioned, the waveguide propagation constant $\gamma$ is assumed to be the same as that in the equivalent transmission line, and it becomes:

$$\gamma^2 = (R + j\omega L)(G + j\omega C), \tag{Eq. 2}$$

where $\omega$ is the angular frequency.

The transverse electric and magnetic field components, $E_t$ and $H_t$, respectively, of the single mode along the z-axis of the waveguide become: (Reference 2: Roger B. Marks and Dylan F. Williams, A general waveguide circuit theory, Journal of Research of NIST, September-October 1992, Vol. 97, No. 5: pp. 533-562.)

$$E_t = [c_f \exp(-\gamma z) + c_b \exp(\gamma z)] e_t = [v(z)/v_0] e_t, \tag{Eq. 3}$$

$$H_t = [c_f \exp(-\gamma z) - c_b \exp(\gamma z)] h_t = [i(z)/i_0] h_t, \tag{Eq. 4}$$

where $c_f$, $c_b$ are the coefficients for combining the forward and the backward fields, respectively, and $e_t$ and $h_t$ are the normalized transverse electric and the magnetic field functions, respectively. $v(z)$ and $i(z)$ are the waveguide voltage and the waveguide current, respectively, and $v_0$ and $i_0$ are the normalization constants.

$v_0$ and $i_0$ are related to the power $p_0$ defined as follows:

$$p_0 = (\tfrac{1}{2}) v_0 i_0^* \tag{Eq. 5}$$

so that the complex power $p(z)$ crossing the transverse plane at z becomes:

$$p(z) = (\tfrac{1}{2}) v(z) i(z)^* \tag{Eq. 6}$$

As mentioned already, the power in the waveguide is assumed to be the same as that in the equivalent transmission line. The power is defined to flow in the direction of the field:

$$Re(p_0) > 0, \tag{Eq. 7}$$

where Re represents the real part.

The forward-mode characteristic impedance is defined as follows:

$$Z_0 = v_0/i_0 = |v_0|^2/(2p_0^*) = 2p_0/|i_0|^2. \tag{Eq. 8}$$

From (Eq. 5) and (Eq. 8), we can see that the phase of the impedance and that of the power should be the same, and the ratio H of the imaginary part to the real part of the power is defined as follows:

$$H = Im(p_0)/Re(p_0) = Im(Z_0)/Re(Z_0), \tag{Eq. 9}$$

where Im represents the imaginary part.

Then the parameters of the equivalent transmission line, R, L, G, and C, can be derived using the waveguide parameters H, $\alpha$, and $\beta$ as follows: (Reference 3: John R. Brews, Transmission line models for lossy waveguide interconnections in VLSI, IEEE Transactions on Electron Devices, Vol. ED-33, No. 9, September 1986: pp. 1356-1365.)

$$\omega L/R = (\alpha H + \beta)/(\alpha - \beta H), \tag{Eq. 10}$$

$$\omega C/G = -(\alpha H - \beta)/(\alpha + \beta H), \tag{Eq. 11}$$

$$GR = (\alpha^2 - \beta^2 H^2)/(1 + H^2), \tag{Eq. 12}$$

$$\omega^2 LC = -(\alpha^2 H^2 - \beta^2)/(1 + H^2). \tag{Eq. 13}$$

As the parameters are determined in the equivalent transmission line, the waveguide circuit can be solved with the familiar transmission circuit theory. The parameters can be found even when the waveguide is lossy, and even when the conductivity and the permittivity of the medium varies with the position. (Reference 3: John R. Brews, Transmission line models for lossy waveguide interconnections in VLSI, IEEE Transactions on Electron Devices, Vol. ED-33, No. 9, September 1986: pp. 1356-1365.)

We can define the forward and backward traveling waves $v_f(z)$ and $v_b(z)$, respectively, by normalizing the modes as follows:

$$v_f(z) = \sqrt{Re(p_0)} c_f \exp(-\gamma z) = \sqrt{Re(p_0)} [v(z) + i(z) Z_0]/(2v_0), \tag{Eq. 14}$$

$$v_b(z) = \sqrt{Re(p_0)} c_b \exp(\gamma z) = \sqrt{Re(p_0)} [v(z) - i(z) Z_0]/(2v_0). \tag{Eq. 15}$$

Then the voltage and the current waves become:

$$v(z) = v_0 [v_f(z) + v_b(z)]/\sqrt{Re(p_0)}, \tag{Eq. 16}$$

$$i(z) = i_0 [v_f(z) - v_b(z)]/\sqrt{Re(p_0)}. \tag{Eq. 17}$$

Then the real power P(z) becomes:

$$P(z) = \text{Re}[p(z)] = \text{Re}[(1/2)v(z)i(z)^*] = \quad \text{(Eq. 18)}$$

$$\text{Re}\{(1/2)v_0 i_0^*[|v_f(z)|^2 - |v_b(z)|^2 + v_b(z)v_f(z)^* - v_b(z)^* v_f(z)]\}/$$

$$\text{Re}(p_0) = |v_f(z)|^2 - |v_b(z)|^2 +$$

$$\text{Re}\{(1/2)v_0 i_0^*[v_b(z)v_f(z)^* - v_b(z)^* v_f(z)]\}/\text{Re}(p_0) =$$

$$|v_f(z)|^2 - |v_b(z)|^2 + (1/2)\text{Re}\{(|i_0|^2 Z_0)j\text{Im}[2v_b(z)v_f(z)^*]\}/\text{Re}(p_0) =$$

$$|v_f(z)|^2 - |v_b(z)|^2 - |i_0|^2 \text{Im}(Z_0)\text{Im}[v_b(z)v_f(z)^*]/\text{Re}(p_0) =$$

$$|v_f(z)|^2 - |v_b(z)|^2 - 2\text{Im}[v_b(z)v_f(z)^*]\text{Im}(Z_0)/\text{Re}(Z_0).$$

The equation above says that the power crossing a plane is not equal to the power carried by the forward wave minus the power carried by the backward wave unless the third term of the last line on the right hand side vanishes. About this equation, Roger B. Marks and Dylan F. Williams, said: "Although the equation is awkward and somewhat counter-intuitive, it is not an artifact of the formulation but an expression of fundamental physics." In other words, if the impedance $Z_0$ is not real, then the power is not a simple difference between those carried by the waves.

To further understand the meaning of their statement, we need to convert the equation above to the one involving the reflection coefficient. The reflection coefficient $\Gamma(z)$ is defined as:

$$\Gamma(z) = v_b(z)/v_f(z). \quad \text{(Eq. 19)}$$

Then the real power P(z) can be expressed as follows:

$$P(z) = |v_f(z)|^2\{1 - |\Gamma(z)|^2 - 2Im[\Gamma(z)]Im(Z_0)/Re(Z_0)\}. \quad \text{(Eq. 20)}$$

N. Marcuvitz derived a similar expression as above and wrote: "it is evident that for dissipative lines $|\Gamma|^2$ can no longer be regarded as the power-reflection coefficient. Moreover, $|\Gamma|$ is not restricted to values equal or less than 1. The meaning of $\Gamma$ as a reflection coefficient can be retained if the voltage and current on the dissipative line are defined so as to make the characteristic admittance real." (Reference 4: Marcuvitz, Waveguide Handbook, New York: MaGraw-Hill, 1951: p. 27.)

In other words, when the impedance $Z_0$ is not real, we need to examine the consequence it brings.

1. Power Difference

Now, the questions we ask are these:
(1) What is the power difference expression between the two points in the (equivalent) transmission line, especially between the load and the source?
(2) Are the powers at the two points same?
(3) If they are not same, what is the condition for the powers to be the same at the two points?
(4) If they are not same, is it possible to make the power difference positive, i.e., the power dissipated at the load bigger than that provided by the source?
(5) If it is possible, then what are the conditions for making the power difference positive?
(6) Is it possible to place the impedance of the circuit to the second or the third quadrant of the complex plane of the impedance? In other words, is it possible to make the power factor be negative? We omit the unit of the power or other physical quantities for convenience.

First, we want to find out the power difference between the two points in a transmission line. The reflection coefficient has the following property: (Reference 5: Sophocles J. Orfanidis, Electromagnetic waves and antennas, Rutgers University, 1999: p. 155. [Online]. Available: http://eceweb1.rutgers.edu/~orfanidi/ewa/)

$$\Gamma(z) = \Gamma(0)\exp(2\gamma z). \quad \text{(Eq. 21)}$$

The power at z=0 is:

$$P(0) = |v_f(0)|^2\{1 - |\Gamma(0)|^2 - 2Im[\Gamma(0)]Im(Z_0)/Re(Z_0)\}. \quad \text{(Eq. 22)}$$

The power at z=−l is:

$$P(-l) = |v_f(-l)|^2\{1 - |\Gamma(-l)|^2 - 2Im[\Gamma(-l)]Im(Z_0)/Re(Z_0)\}. \quad \text{(Eq. 23)}$$

Therefore, the power difference between the two points at z=0 and at z=−l becomes:

$$P(0) - P(-l) = |v_f(0)|^2\{1 - |\Gamma(0)|^2 - 2Im[\Gamma(0)]Im(Z_0)/Re(Z_0)\} - |v_f(-l)|^2\{1 - |\Gamma(-l)|^2 - 2Im[\Gamma(-l)]Im(Z_0)/Re(Z_0)\}. \quad \text{(Eq. 24)}$$

When we compare the powers measured at two different points, we do not want to consider the loss occurred in the transmission line when the waves propagate, so we let:

$$\alpha = 0. \quad \text{(Eq. 25)}$$

Then, $$v_f(0) = v_f(-l)\exp(-j\beta l), \quad \text{(Eq. 26)}$$

$$|v_f(0)| = |v_f(-l)|, \quad \text{(Eq. 27)}$$

$$\Gamma(-l) = \Gamma(0)\exp(-j2\beta l), \quad \text{(Eq. 28)}$$

$$|\Gamma(-l)| = |\Gamma(0)|, \quad \text{(Eq. 29)}$$

$$\quad \text{(Eq. 30)}$$

$$P(0) - P(-l) = |v_f(0)|^2\{-2Im[\Gamma(0)]Im(Z_0) + 2Im[\Gamma(-l)]Im(Z_0)/Re(Z_0)\} =$$

$$2|v_f(0)|^2 [Im(Z_0)/Re(Z_0)\{m[\Gamma(-l)] - Im[\Gamma(0)]\}.$$

Let $\Gamma(0)$ be expressed as:

$$\Gamma(0) = |\Gamma(0)|\exp(j\theta_0), \quad \text{(Eq. 31)}$$

where $\theta_0$ is the phase of $\Gamma(0)$.
Then, $$Im[\Gamma(0)] = |\Gamma(0)|\sin\theta_0, \quad \text{(Eq. 32)}$$

$$\quad \text{(Eq. 33)}$$

$$Im[\Gamma(-l)] = Im[\Gamma(0)\exp(-j2\beta l)] = Im[|\Gamma(0)|\exp(j\theta_0)\exp(-j2\beta l)] =$$

$$Im\{|\Gamma(0)|\exp[j(\theta_0 - 2\beta l)]\} = |\Gamma(0)|\sin(\theta_0 - 2\beta l).$$

Then, the power difference becomes:

$$\quad \text{(Eq. 34)}$$

$$P(0) - P(-l) = 2|v_f(0)|^2[Im(Z_0)/Re(Z_0)]|\Gamma(0)|[\sin(\theta_0 - 2\beta l) - \sin\theta_0] =$$

$$-4|v_f(0)|^2[Im(Z_0)/Re(Z_0)]|\Gamma(0)|\cos(\theta_0 - \beta l)\sin(\beta l).$$

Therefore, the powers at the two points of the transmission line are the same if the characteristic impedance $Z_0$ of the transmission line is real, or $$|\Gamma(0)| = 0, \text{ or} \quad \text{(Eq. 35)}$$

$$\beta l = k\pi, \text{ or} \quad \text{(Eq. 36)}$$

$$\beta l = \theta_0 + \pi/2 + k\pi, \quad \text{(Eq. 37)}$$

where k is an integer.

When the impedance of the load is matched with the impedance of the transmission line, |Γ(0)| becomes zero, and the powers at the two points are the same.

Another condition for the powers being the same is $\beta l = k\pi$, and in that case, $$l = k\lambda/2, \quad (Eq. 38)$$

where $\lambda$ is the wavelength. In other words, when the length of the transmission line is a multiple of the half wavelength, the powers are the same at the two points of the transmission line.

Still another condition for the power being the same is $\beta l = \theta_0 + \pi/2 + k\pi$.

As the wave goes to the load side, it undergoes changes that include an attenuation and a phase change of $(-\phi)$, where $\phi$, the relative phase, is related to the distance l as follows:

$$\phi = \beta l = \omega l/v = 2\pi f l/v, \quad (Eq. 39)$$

where $v$ is the phase velocity of the signal in the transmission line and f is the frequency.

Note that the relative phase $\phi$ is the absolute amount of the phase change that the wave undergoes in the transmission line, and is proportional to the frequency. It can be controlled by changing the frequency, and therefore, we can find the right frequency to satisfy the conditions described above.

The fact that there are frequencies that make the power difference become zero suggests that there are frequencies to make power difference positive or negative.

If the above conditions to make the power difference zero are not met, then the power difference is not equal to zero, and the powers are not the same at the two points. Not only the powers are not the same, but also it is possible to make the power difference positive by controlling the phase change in the transmission line.

So far, the questions 1 to 4 we raised are answered. In the following, to complement the answers, we derive the power equations in a transmission line and show that the power equation (Eq. 34) above is true. We show that if the powers at the two points in the transmission line are compared, there is a discrepancy in the quantity because of the phase difference that occurs when the wave propagates when the impedance $Z_0$ of the transmission line is not real.

Also, for the rest of the questions, we show that the power difference can become positive, which means that the power dissipated at the load can be larger than that provided by the source. We also find the condition under which the power difference becomes positive.

2. The Traditional Modeling of the Processes in a Transmission Line

FIG. 1 shows a transmission line circuit.

Consider the propagation of the voltage and the current waves, v and i, respectively, driven by a voltage source, $v_S$, with the angular frequency of $\omega$, through a transmission line as in FIG. 1.

Here, the length of the transmission line is l. The source side has the impedance $Z_S$ which can be the internal impedance of the source and can include the load at the source side.

$Z_T$ and $Z_L$ are the characteristic impedance of the transmission line and the impedance of the load at the rear-end respectively. Let the source be at $z=-l$ at a distance l from the load, while the load at the rear-end is located at $z=0$. In the following, the load at the rear-end is described simply as "the load" unless otherwise specified.

The propagation constant in the transmission line, $\gamma_T$, is:

$$\gamma_T = \alpha_T + j\beta_T, \quad (Eq. 40)$$

where $\alpha_T$ and $\beta_T$ are the attenuation constant and the phase constant in the transmission line, respectively.

Let us consider the process that takes place when the voltage supply is connected to the load through the transmission line with reflections both at the load and at the source side. To differentiate the incident and the reflected waves more explicitly, let $v_i(-l)$ and $i_i(-l)$ be the voltage and the current waves transmitted from the source, respectively. Here, the subscript i means "incident." The current, $i_i(-l)$, becomes:

$$i_i(-l) = v_i(-l)/Z_T. \quad (Eq. 41)$$

The amount of the phase change the wave undergoes is $(-\phi_T)$, where $\phi_T$, the relative phase, is related to the distance l as follows:

$$\phi_T = \beta_T l. \quad (Eq. 42)$$

Then at the load side, the voltage, $v_i(0)$, and the reflected voltage, $v_r(0)$, become:

$$v_i(0) = \exp(-\gamma_T l) v_i(-l), \quad (Eq. 43)$$

$$v_r(0) = \delta_L v_i(0) = \exp(-\gamma_T l) \Gamma_L v_i(-l), \quad (Eq. 44)$$

where the subscript r means "reflected," and $\Gamma_L$ is the voltage reflection coefficient at the load:

$$\Gamma_L = (Z_L - Z_T)/(Z_L + Z_T) = |\Gamma_L| \exp(\theta_\Gamma), \quad (Eq. 45)$$

where $\theta_\Gamma$ is the phase of $\Gamma_L$.

The voltage and the current at the point A in FIG. 1 which is at the front-end of the transmission line, $v(-l)$ and $i(-l)$, respectively, become:

$$v(-l) = v_s - i(-l) Z_S = v_i(-l) + v_r(-l), \quad (Eq. 46)$$

$$i(-l) = [v_i(-l) - v_r(-l)]/Z_T, \quad (Eq. 47)$$

where $v_r(-l)$ is the voltage when the reflected voltage at the load side, $v_r(0)$, is propagated to the source side. Therefore, $v_i(-l)$ is:

$$v_i(-l) = \quad (Eq. 48)$$
$$v_s Z_T/(Z_S + Z_T) + v_r(-l)(Z_S - Z_T)/(Z_S + Z_T) = \eta v_s + \Gamma_S v_r(-l),$$

$$\eta = Z_T/(Z_S + Z_T), \quad (Eq. 49)$$

$$\Gamma_S = (Z_S - Z_T)/(Z_S + Z_T), \quad (Eq. 50)$$

where $\Gamma_S$ is the reflection coefficient at the source side. It says that the voltage, $v_i(-l)$, consists of two parts. The first one is the one where the voltage is divided by the impedances, and the second one is related to the reflected wave at the source side which comes from the load.

Then this process repeats infinitely, as each wave is reflected not only at the load side, but also at the source side. In case when the waves reflect at the load and come back to the source side, there is another same amount of the attenuation and the phase change by the factor of $\exp(-\gamma_T l)$. Therefore, the reflected voltage wave at the source, $v_r(-l)$, can be written as:

$$v_r(-l) = \exp(-\gamma_T l) v_r(0) = \exp(-2\gamma_T l) \Gamma_L v_i(-l). \quad (Eq. 51)$$

Substituting $v_r(-l)$ into the equation for $v_i(-l)$ and solving for $v_i(-l)$, it becomes:

$$v_i(-l) = \eta v_s/[1 - \exp(-2\gamma_T l) \Gamma_S \Gamma_L]. \quad (Eq. 52)$$

Therefore, the voltages and the currents at the source at $z=-l$, and at the load side at $z=0$, become:

$$v(-l) = v_i(-l) + v_r(-l) = v_i(-l) + \exp(-2\gamma_T l)\Gamma_L v_i(-l) = \quad \text{(Eq. 53)}$$
$$\eta v_s[1 + \exp(-2\gamma_T l)\Gamma_L]/[1 - \exp(-2\gamma_T l)\Gamma_S \Gamma_L],$$

$$v(0) = v_i(0) + v_r(0) = \exp(-\gamma_T l)v_i(-l) + v_r(0) = \quad \text{(Eq. 54)}$$
$$\exp(-\gamma_T l)v_i(-l) + \exp(-\gamma_T l)\Gamma_L v_i(-l) = \exp(-\gamma_T l)(1 + \Gamma_L) v_i(-l) =$$
$$\exp(-\gamma_T l)(1 + \Gamma_L)\eta v_s / [1 - \exp(-2\gamma_T l)\Gamma_S \Gamma_L],$$

$$i_i(0) = \exp(-\gamma_T l) i_i(-l) = \exp(-\gamma_T l) v_i(-l)/Z_T, \quad \text{(Eq. 55)}$$

$$i_r(0) = -\Gamma_L i_i(0) = -\exp(-\gamma_T l)\Gamma_L v_i(-l)/Z_T, \quad \text{(Eq. 56)}$$

$$i_r(-l) = \exp(-\gamma_T l)i_r(0) = -\exp(-2\gamma_T l)\Gamma_L v_i(-l)/Z_T, \quad \text{(Eq. 57)}$$

$$i(-l) = i_i(-l) + i_r(-l) = v_i(-l)/Z_T - \exp(-2\gamma_T l)\Gamma_L v_i(-l)/Z_T = \quad \text{(Eq. 58)}$$
$$v_i(-l)[1 - \exp(-2\gamma_T l)\Gamma_L]/Z_T.$$

Now, let us assume that the characteristic impedance $Z_T$ of the transmission line has a real value. The power measured at the point A in FIG. 1, $P_s$, is:

$$\text{(Eq. 59)}$$
$$P_s = (1/2)\operatorname{Re}[v(-l)i(-l)^*] = (1/2)\operatorname{Re}\{[v_i(-l) + v_r(-l)][i_i(-l) + i_r(-l)]^*\} =$$
$$\operatorname{Re}([1 + \exp(-2\gamma_T l)\Gamma_L]v_i(-l)\{[1 - \exp(-2\gamma_T l)\Gamma_L]v_i(-l)\}^*)/(2Z_T) =$$
$$|v_i(-l)|^2 \operatorname{Re}[1 - \exp(-2\gamma_T l)^*\Gamma_L^* + \exp(-2\gamma_T l)\Gamma_L - \exp(-4\alpha_T l)|\Gamma_L|^2]/$$
$$(2Z_T) = |v_i(-l)|^2[1 - \exp(-4\alpha_T l)|\Gamma_L|^2]/(2Z_T).$$

The power absorbed by the load, $P_l$, is:

$$\text{(Eq. 60)}$$
$$P_l = 1/2 \operatorname{Re}\{[v_i(0) + v_r(0)][i_i(0) + i_r(0)]^*\} =$$
$$\operatorname{Re}\{\exp(-\gamma_T l)(1 + \Gamma_L) v_i(-l)[\exp(-\gamma_T l)(1 - \Gamma_L)v_i(-l)]^*\}/(2Z_T) =$$
$$\exp(-2\alpha_T l) |v_i(-l)|^2 \operatorname{Re}(1 - \Gamma_L^* + \Gamma_L - |\Gamma_L|^2)/(2Z_T) =$$
$$\exp(-2\alpha_T l) |v_i(-l)|^2 (1 - |\Gamma_L|^2)/(2Z_T).$$

Therefore, when neglecting the attenuation, the power expressions $P_s$ at the point A and $P_l$ at the load are the same.

The result shown above is when we assume that the characteristic impedance of the transmission line has a real value. Since the characteristic impedance of the transmission line is expressed as:

$$Z_T = \sqrt{(R+j\omega L)/(G+j\omega C)}, \quad \text{(Eq. 61)}$$

it becomes real when the frequency is high enough so that R and G values can be neglected. In the conventional traditional transmission line theory, it is assumed that the frequency is high enough so that the characteristic impedance of the transmission line has a real value. In the following, we will deal with the case when the characteristic impedance is not real, and show that the power provided by the source is not same as that dissipated at the load.

3. Powers and Impedance when Impedance of the Transmission Line is not Real

Now, we need to examine what happens when the characteristic impedance of the transmission line has a complex value, not a real value. It happens when the frequency of the wave is high so that the transmission line model fits, but not high enough to make the characteristic impedance become real.

Let the characteristic impedance $Z_T$ of the transmission line be expressed as:

$$Z_T = |Z_T|\exp(j\theta_T), \quad \text{(Eq. 62)}$$

where $\theta_T$ is the phase of $Z_T$.

3.1 Power

The power provided by the source at the point A in FIG. 1, $P_S$, is:

$$\text{(Eq. 63)}$$
$$P_S =$$
$$(1/2)\operatorname{Re}[v(-l)i(-l)^*] = (1/2)\operatorname{Re}\{[v_i(-l) + v_r(-l)][i_i(-l) + i_r(-l)]^*\} = (1/2)$$
$$\operatorname{Re}([1 + \exp(-2\gamma_T l)\Gamma_L] v_i(-l)\{[1 - \exp(-2\gamma_T l)\Gamma_L]v_i(-l)/Z_T\}^*) = (1/2)$$
$$|v_i(-l)|^2\operatorname{Re}[1 - \exp(-2\gamma_T l)^*\Gamma_L^* + \exp(-2\gamma_T l)\Gamma_L - \exp(-4\alpha_T l)|\Gamma_L|^2]/Z_T^* =$$
$$(1/2)|v_i(-l)|^2[\cos\theta_T - \exp(-2\alpha_T l)|\Gamma_L|\cos(\theta_\Gamma - \theta_T - 2\phi_T) +$$
$$\exp(-2\alpha_T l)|\Gamma_L|\cos(\theta_\Gamma + \theta_T - 2\phi_T) - \exp(-4\alpha_T l)|\Gamma_L|^2\cos\theta_T]/|Z_T|.$$

The power absorbed by the load, $P_L$, is:

$$\text{(Eq. 64)}$$
$$P_L = 1/2 \operatorname{Re}\{[v_i(0) + v_r(0)][i_i(0) + i_r(0)]^*\} =$$
$$(1/2)\operatorname{Re}\{\exp(-\gamma_T l)(1 + \Gamma_L) v_i(-l)[\exp(-\gamma_T l)(1 - \Gamma_L)v_i(-l)/Z_T]^*\} = (1/2)$$
$$\exp(-2\alpha_T l) |v_i(-l)|^2 \operatorname{Re}[(1 - \Gamma_L^* + \Gamma_L - |\Gamma_L|^2)/Z_T^*] = (1/2) \exp(-2\alpha_T l)$$
$$|v_i(-l)|^2 [\cos\theta_T - |\Gamma_L|\cos(\theta_\Gamma - \theta_T) + |\Gamma_L|\cos(\theta_\Gamma + \theta_T) - |\Gamma_L|^2\cos\theta_T]/|Z_T|.$$

Note that the power $P_S$ depends on the relative phase $\phi_T$, while the power $P_L$ does not. And it is clear from the power expressions that the powers $P_S$ and $P_L$ are not the same. Neglecting the attenuation, the power difference $P_D$ between $P_L$ and $P_S$ is expressed as follows:

$$\text{(Eq. 65)}$$
$$P_D = P_L - P_S =$$
$$(1/2)|v_i(-l)|^2[\cos\theta_T - |\Gamma_L|\cos(\theta_\Gamma - \theta_T) + |\Gamma_L|\cos(\theta_\Gamma + \theta_T) - |\Gamma_L|^2\cos\theta_T]/$$
$$|Z_T| - (1/2)|v_i(-l)|^2[\cos\theta_T - |\Gamma_L|\cos(\theta_\Gamma - \theta_T - 2\phi_T) +$$
$$|\Gamma_L|\cos(\theta_\Gamma + \theta_T - 2\phi_T) - |\Gamma_L|^2\cos\theta_T]/|Z_T| =$$
$$(1/2)|v_i(-l)|^2[-|\Gamma_L|\cos(\theta_\Gamma - \theta_T) + |\Gamma_L|\cos(\theta_\Gamma - \theta_T - 2\phi_T) +$$
$$|\Gamma_L|\cos(\theta_\Gamma + \theta_T) - |\Gamma_L|\cos(\theta_\Gamma + \theta_T - 2\phi_T)]/|Z_T| =$$
$$(1/2)|v_i(-l)|^2|\Gamma_L|[2\sin(\theta_\Gamma - \theta_T - 2\phi_T)\sin\phi_T - 2\sin(\theta_\Gamma + \theta_T - \phi_T)\sin\phi_T]/$$
$$|Z_T| = -2|v_i(-l)|^2|\Gamma_L| \sin\phi_T\cos(\theta_\Gamma - \phi_T)\sin(\theta_T)/|Z_T|.$$

Now, we need to compare this result with the power difference in (Eq. 34). First we observe that:

$$Z_0 = Z_T, \quad \text{(Eq. 66)}$$
$$\Gamma(0) = \Gamma_L, \quad \text{(Eq. 67)}$$
$$\theta_0 = \theta_\Gamma, \quad \text{(Eq. 68)}$$
$$\beta l = \phi = \beta_T l = \phi_T, \quad \text{(Eq. 69)}$$
$$|v_i(0)| = |v_i(-l)|. \quad \text{(Eq. 70)}$$

Note that, according to (Eq. 16), the forward wave $v_f(0)$ in (Eq. 14) and the voltage wave $v_i(0)$ in (Eq. 43) have the following relations:

$$v_i(0) = v_0 v_f(0) / \sqrt{\text{Re}(p_0)},$$ (Eq. 71)

$$|v_i(0)|^2 = |v_0|^2 |v_f(0)|^2 / \text{Re}(p_0) =$$ (Eq. 72)

$$|v_f(0)|^2 / \text{Re}(p_0/|v_0|^2) = |v_f(0)|^2 / \text{Re}[1/(2Z_T^*)] = 2|v_f(0)|^2 / (\cos\theta_T / |Z_T|) =$$

$$2|v_f(0)|^2 |Z_T| / \cos\theta_T$$

$$|v_f(0)|^2 = |v_i(0)|^2 \cos\theta_T / (2|Z_T|)$$ (Eq. 73)

Then (Eq. 34) becomes:

$$P_D = P(0) - P(-l) = -4|v_f(0)|^2 (\sin\theta_T / \cos\theta_T)|\Gamma_L|\cos(\theta_\Gamma - \theta_T)\sin\theta_T =$$ (Eq. 74)

$$-2|v_i(0)|^2 \cos\theta_T (\sin\theta_T / \cos\theta_T)|\Gamma_L|\cos(\theta_\Gamma - \theta_T)\sin\theta_T / |Z_T| =$$

$$-2|v_i(0)|^2 |\Gamma_L|\sin\theta_T \cos(\theta_\Gamma - \theta_T)\sin\theta_T / |Z_T|.$$

Note that this expression is exactly the same as (Eq. 65) as it should be.

Moreover, the power difference $P_D$ becomes positive if the following condition is satisfied:

$$\sin\phi_T \cos(\Gamma_F - \phi_T)\sin\theta_T < 0.$$ (Eq. 75)

The condition above can be satisfied, for instance, if $\phi_T$ and $\theta_\Gamma$ are angles in the first quadrant, and $\theta_T$ is in the fourth quadrant. Therefore, the power dissipated at the load can be larger than that provided by the source.

It is easy to see that the power difference $P_D$ becomes maximized when the magnitudes of the sine and the cosine functions at the last line of (Eq. 74) get maximized under the condition that the power difference is positive. Note that $\phi_T$ and $\theta_\Gamma$ can have any value, while $\theta_T$ is within certain range as in (Eq. 103) below. Therefore, the maximum absolute value of $\sin\phi_T$ or $\cos(\theta_\Gamma - \phi_T)$ is 1, whereas the maximum absolute value of $\sin\theta_T$ is $\sin(\pi/4)$.

The power $P_L$ at the load gets a maximum value when the impedance of the load is matched with the characteristic impedance of the transmission line. But when the impedance of the load is matched, the power difference becomes zero, so the case is not desirable nor dealt with in this invention. When the impedance of the load is almost matched, $|\Gamma_L|$ becomes close to zero, and because the power difference is proportional to $|\Gamma_L|$ as in (Eq. 74), the power difference becomes almost zero, which is also not desirable. Therefore, it is necessary to have a compromise between maximizing the power difference and maximizing the power dissipated at the load when designing a power generating machine.

The relative phase $\phi_T$ can be controlled by the frequency or by the length of the transmission line. The phase $\theta_T$ of the characteristic impedance of the transmission line is determined by designing the transmission line with appropriate values of R, L, G, and C. The phase $\theta_\Gamma$ of the reflection coefficient can be determined by the characteristic impedance of the transmission line and the impedance of the load.

Note that the power $P_S$ does not include the power losses such as ohmic loss occurring in the transmission line. The power $P_S$ at the front-end of the transmission line is the counterpart of the power $P_L$ dissipated at the load. Therefore, the actual power $P_m$ supplied by the source when measured at the front-end of the transmission line is larger than the power $P_S$ by the amount of power loss $P_{loss}$:

$$P_m = P_S + P_{loss}.$$ (Eq. 76)

Therefore, in a real application, the power difference between the power measured at the load and that at the front-end of the transmission line is expressed as $(P_L - P_m)$.

3.2 Impedance

The impedance $Z(-l)$ of the circuit at the point A in FIG. 1 is:

(Eq. 77)

$$Z(-l) = v(-l) /$$

$$i(-l) = [1 + \exp(-2\gamma_T l)\Gamma_L] v_i(-l) / (\{[1 - \exp(-2\gamma_T l)\Gamma_L] v_i(-l)\} / Z_T) =$$

$$Z_T [1 + \exp(-2\gamma_T l)\Gamma_L] / [1 - \exp(-2\gamma_T l)\Gamma_L] =$$

$$Z_T [1 + \exp(-2\alpha_T l)\exp(-j2\phi_T)\Gamma_L] / [1 - \exp(-2\alpha_T l)\exp(-j2\phi_T)\Gamma_L].$$

Note that the impedance is dependent on the relative phase $\phi_T$. Therefore, the impedance of the transmission line circuit can be adjusted by controlling the relative phase $\phi_T$.

If the impedance $Z_S$ at the source side is included, the impedance of the circuit, $Z_A$, becomes:

$$Z_A = Z(-l) + Z_S.$$ (Eq. 78)

Let the factor in the numerator of (Eq. 77) be expressed as follows:

$$B = |B|\exp(j\theta_B) = 1 + \exp(-2\gamma_T l)\Gamma_L = 1 + \exp(-2\alpha_T l)$$
$$|\Gamma_L|\exp[j(\theta_\Gamma - 2\phi_T)],$$ (Eq. 79)

where $\theta_B$ is the phase of B.

The magnitude of the reflection coefficient, $|\Gamma_L|$, is:

$$|\Gamma_L| = |(Z_L - Z_T)/(Z_L + Z_T)| = |(Z_L/Z_T - 1)/(Z_L/Z_T + 1)|.$$ (Eq. 80)

$Z_L/Z_T$ can be described as:

$$Z_L/Z_T = a + jb,$$ (Eq. 81)

where a and b are real numbers.

If the following is satisfied:

$$a \geq 0,$$ (Eq. 82)

then $$|\Gamma_L| = |(a-1+jb)/(a+1+jb)| = \sqrt{(a-1)^2 + b^2} / \sqrt{(a+1)^2 + b^2} \leq 1.$$ (Eq. 83)

The equation above is true, for instance, when $Z_T$ is real and the load consists of the passive elements such as resistors, capacitors, and inductors. But if $Z_T$ is not real, then $|\Gamma_L|$ can become greater than 1.

FIG. 2 shows the numerator of the impedance $Z(-l)$ represented in the complex plane.

Let us first consider the case of $|\Gamma_L| \leq 1$.

Then, the followings are true:

$$\exp(-2\alpha_T l) \leq 1,$$ (Eq. 84)

$$\exp(-2\alpha_T l)|\Gamma_L| \leq 1,$$ (Eq. 85)

$$1 - \exp(-2\alpha_T l)|\Gamma_L| \leq |B| \leq 1 + \exp(-2\alpha_T l)|\Gamma_L|.$$ (Eq. 86)

B can be represented as a circle with the radius of r in the complex plane as shown in FIG. 2:

$$r = \exp(-2\alpha_T l)|\Gamma_L|.$$ (Eq. 87)

The maximum and minimum phase angles, $\theta_{BMax}$ and $\theta_{BMin}$, that B can have lie in the first and the fourth quadrants, respectively.

Likewise, the factor $[1-\exp(-2\gamma_T l)\Gamma_L]$ in the denominator of the impedance $Z(-l)$ can be represented as a circle in the complex plane. Let the denominator be represented as follows:

$$F=|F|\exp(j\theta_F)=1-\exp(-2\gamma_T l)\Gamma_L, \quad \text{(Eq. 88)}$$

where $\theta_F$ is the phase of F. The maximum and minimum phase angles, $\theta_{FMax}$ and $\theta_{FMin}$, that F can have lie in the first and the fourth quadrants, respectively.

Without loss of the generality, let us assume that F is in the first quadrant, and B is in the fourth quadrant. And consider the case when the following conditions hold:

$$|F| \leq |B|, \quad \text{(Eq. 89)}$$

$$\theta_F \geq |\theta_B|. \quad \text{(Eq. 90)}$$

FIG. 3 shows the factors of the impedance $Z(-l)$ represented in the complex plane.

Then, from FIG. 3, it is easy to see that $(\theta_F-\theta_B)$ is maximized when radius r of the circle is one.

FIG. 4 shows the factors of the impedance $Z(-l)$ represented in the complex plane when (r=1).

Then, in that case, from FIG. 4, the triangles MNP and MPW are isosceles triangles. Therefore, the followings hold:

$$r=1, \quad \text{(Eq. 91)}$$

$$\angle MNP=\theta_F, \quad \text{(Eq. 92)}$$

$$\angle MWP=|\theta_B|, \quad \text{(Eq. 93)}$$

$$\theta_F-\theta_B+\angle MNP+\angle MWP=180°, \quad \text{(Eq. 94)}$$

$$\theta_F-\theta_B=\angle MNP+\angle MWP=90°, \quad \text{(Eq. 95)}$$

where the symbol $\angle$ denotes the angle. When the radius r is 1, $(\theta_F-\theta_B)$ is always $\pi/2$. When $|F|>|B|$, the same result holds.

Therefore, the maximum value of $(\theta_F-\theta_B)$ is:

$$\text{Max}(\theta_F-\theta_B)=\pi/2. \quad \text{(Eq. 96)}$$

When B is in the first quadrant and F is in the fourth quadrant, $$\text{Max}(\theta_B-\theta_F)=\pi/2. \quad \text{(Eq. 97)}$$

Therefore, in general, the range of $(\theta_B-\theta_F)$ is as follows:

$$-\pi/2 \leq (\theta_B-\theta_F) \leq \pi/2, \quad \text{(Eq. 98)}$$

Now, the impedance of the circuit can be written as:

(Eq. 99)
$$Z(-l) = |Z(-l)|\exp(j\theta_C) = Z_T[1+\exp(-2\gamma_T l)\Gamma_L]/[1-\exp(-2\gamma_T l)\Gamma_L] =$$
$$Z_T B/F = Z_T(|B|/|F|)\exp[j(\theta_B-\theta_F)] = (|Z_T||B|/|F|)\exp[j(\theta_T+\theta_B-\theta_F)],$$

where $\theta_C$ is the phase of the impedance $Z(-l)$.

Let us represent the complex values related to the parameters of the transmission line as follows:

$$R+j\omega L=\sqrt{R^2+(\omega L)^2}\exp(j\theta_R), \quad \text{(Eq. 100)}$$

$$G+j\omega C=\sqrt{G^2+(\omega C)^2}\exp(j\theta_G), \quad \text{(Eq. 101)}$$

where $\theta_R$ and $\theta_G$ are the corresponding phases, respectively.

The impedance of the transmission line is square root of the ratio of the two quantities above as in (Eq. 61). Assuming R and G are non-negative which is true when the waveguide material is passive, the complex numbers $(R+j\omega L)$ and $(G+j\omega C)$ lie in the same quadrant of the complex plane either in the first or the fourth quadrant. (Reference 2: Roger B. Marks and Dylan F. Williams, A general waveguide circuit theory, Journal of Research of NIST, September-October 1992, Vol. 97, No. 5: pp. 533-562.) The range of the phase difference $(\theta_R-\theta_G)$ is as follows:

$$-\pi/2 \leq (\theta_R-\theta_G) \leq \pi/2. \quad \text{(Eq. 102)}$$

Since the phase of $Z_T$ is $(\theta_R-\theta_G)/2$, its value is within the range as follows:

$$-\pi/4 \leq \theta_T=(\theta_R-\theta_G)/2 \leq \pi/4. \quad \text{(Eq. 103)}$$

Then, the range of the phase $\theta_C$ of the impedance $Z(-l)$ is as follows:

$$-3\pi/4 \leq \theta_C=(\theta_T+\theta_B-\theta_F) \leq 3\pi/4. \quad \text{(Eq. 104)}$$

In other words, the impedance $Z(-l)$ of the transmission line circuit can be placed in any quadrant, including the third or the fourth quadrant where the power factor is less than zero. When the power factor is less than zero, the power flows back to the source side on average:

$$P_S<0. \quad \text{(Eq. 105)}$$

This clearly shows that the circuit can be used as a power generator. Note that, in that case, the power is still dissipated at the load while the power flows back to the source. When the power factor is less than zero, the power difference $P_D$ is always positive:

$$P_D=P_L-P_S>0. \quad \text{(Eq. 106)}$$

Next, in case of $$|\Gamma_L|>1, \quad \text{(Eq. 107)}$$

the radius of the circle in FIG. 2 is larger than the one in case of $|\Gamma_L| \leq 1$, and so it is easy to see that we can place the phase $\theta_C$ in any quadrant by adjusting the relative phase $\phi_T$, the characteristic impedance of the transmission line, and the impedance of the load.

Let r be as follows when the equation above is satisfied:

$$r=\exp(-2\alpha_T l)|\Gamma_L|=1+\varepsilon, \quad \text{(Eq. 108)}$$

where $\varepsilon$ is a positive number.

FIG. 5 shows the factors of the impedance $Z(-l)$ represented in the complex plane when (r>1).

Then, as seen in FIG. 5, if $$\theta_T-2\phi_T \approx 0, \quad \text{(Eq. 109)}$$

then $$|\theta_B-\theta_F| \approx \pi. \quad \text{(Eq. 110)}$$

The equation above is true even if r is a little bit larger than 1:

$$\varepsilon=0^+. \quad \text{(Eq. 111)}$$

Therefore, in case when r is larger than 1, the phase $\theta_C$ of the impedance of the transmission line circuit can have any value from $-\pi$ to $\pi$ by controlling the relative phase $\phi_T$. Note that in this case, the phase $(\theta_B-\theta_F)$ can be already in any quadrant even if the phase $\theta_T$ of the transmission is not added to make the phase of the impedance of the circuit. When the phase of the impedance of the circuit is $\pi$, then the circuit has a negative resistance.

Let us consider another example. When the followings are satisfied:

$$r=\exp(-2\alpha_T l)|\Gamma_L|=\tan[3/(8\pi)], \quad \text{(Eq. 112)}$$

$$\theta_F=|\theta_B|, \quad \text{(Eq. 113)}$$

then, $$\theta_F-\theta_B=3\pi/4, \quad \text{(Eq. 114)}$$

$$\theta_C=\theta_T+\theta_B-\theta_F=\theta_T-3\pi/4 \quad \text{(Eq. 115)}$$

$$|B|/|F|=1, \quad \text{(Eq. 116)}$$

$$Z(-l)=Z_T(|B|/|F|)\exp[j(\theta_B-\theta_F)]=|Z_T|\exp[j(\theta_T-3\pi/4)]. \quad \text{(Eq. 117)}$$

In this case, the magnitude of the impedance of the circuit is the same as the characteristic impedance of the transmission line. Since the magnitude of $\theta_T$ is not greater than $\pi/4$, the impedance of the circuit lies in the third quadrant, realizing a negative power factor.

The relative phase $\phi_T$ can be controlled by the frequency or by the length of the transmission line. The frequency should not be high enough to make the characteristic impedance of the transmission line to be real. The phase $\theta_T$ of the characteristic impedance of the transmission line is determined by selecting the values of R, L, G, and C when designing the transmission line. The phase $\theta_\Gamma$ of the reflection coefficient is determined by the characteristic impedance of the transmission line and the impedance of the load. Therefore, by choosing an appropriate frequency, a transmission line and its length, and a load, one can achieve the negative power factor in a waveguide circuit or a transmission line circuit.

Note that once the medium and the structure and load are chosen for the waveguide circuit or the transmission line circuit, the variable to adjust the phase and the impedance of the circuit is the relative phase $\phi_T$, because the relative phase is controlled by the frequency.

4. The Power Generating Transmission Line System (PGTLS)

4.1 The Power Generating Transmission Line System

In general, a transmission line is used for transmitting electrical or electromagnetic signals. From now on, the transmission line systems not only include the circuits with the transmission lines such as coaxial cable, microstrip, triplate, or stripline, but also the circuits with the waveguides such as optical fiber and photonic-crystal fiber, when the waveguide circuits are converted to the equivalent transmission line circuits. Essentially every possible waveguide circuit through which the electromagnetic wave propagates can be included in the transmission line system described in this invention from now on. It is because a waveguide circuit can be converted to a circuit of the equivalent transmission line model as already mentioned.

As the principles described in this invention is applicable to all the general transmission line circuits, the transmission line circuits described in this invention not only include the waveguide circuit which is transformed to an equivalent transmission line circuit, but also include the transmission line circuit not converted from the waveguide circuit.

The main purpose of the transmission line circuit invented here is not simply for providing power dissipated at the load. On the contrary, it is to generate power at the load by the principle that the power provided by the source and the impedance of the circuit depend on the amount of the phase change of the wave and other variables as described in (Eq. 74) and (Eq. 77).

Therefore, in this transmission line circuit, the power provided by the source becomes small or negative on average, as the power factor can be close to zero or negative. To accomplish it, the power factor of the circuit needs to be adjusted by controlling the relative phase.

It is possible to find out the right combination of the frequency and/or length of the transmission line, and/or the reactive component in addition to the load to be added, to get the desired phase of the impedance of the circuit.

Also, the transmission line should be constructed to have the necessary phase. The four parameters, R, L, G, and C of the transmission line should be chosen to satisfy the desired phase of the impedance of the circuit and the characteristic impedance which is related to the reflection coefficient through the impedance of the load.

As we deal with the practical application of making a power generating machine, from now on, the power difference ($P_L-P_m$) replaces the power difference ($P_L-P_S$), and is denoted as $P_D$ unless otherwise specified.

The system needs to have an AC (alternating voltage) generator to generate the right frequency so that the circuit can have the desired power factor or the relative phase. The conditions for the relative phase that this AC generator should generate are described in (Eq. 75). Therefore, the AC generator and the transmission line circuit should be paired together so that they can work as the power generator. It is different from the common transmission line circuit in that respect.

In the "power generating transmission line system (PGTLS)" of this invention, the AC generator should be closely matched to the configurations of the transmission line to have the frequency in the right frequency region or to have the appropriate relative phase, so that the power difference $P_D$ should be positive.

FIG. 6 shows a power generating transmission line system (PGTLS).

The "AC generator with the right Frequency (AGRF)" module in FIG. 6 can consist, for example, of two parts: the frequency synthesizer (or signal generator) (Reference 6: Dean Banerjee, PLL Performance, Simulation and Design, 4th ed. Dog Ear Publishing, LLC., August 2006.) and the amplifier parts. The signal generator generates the frequency that makes the power difference $P_D$ positive in the "Transmission line circuit (TLC)," and the amplifier section amplifies the wave of the frequency generated by the signal generator to feed into TLC with the right voltage amplitude. For example, an AGRF can be a pulse wave generator such as an H-bridge. We will explain it more later.

4.2 Transmission Line Circuit (TLC)

In addition to the load at the rear-end of the transmission line, there can be a load at the source side in a PGTLS. The load can be AC electronic device(s) or DC device(s). If it is DC device(s), then a rectifier is necessary in the TLC that converts AC to DC which goes into the device(s). Therefore, the TLC mentioned here refers to a circuit which includes the necessary rectifier when the load is DC device(s). The load can include one or more batteries or (super)capacitors. When necessary, the voltage can be adjusted in the TLC to an appropriate level so that it can charge the batteries or (super)capacitors. In that case, the batteries or the (super) capacitors work as a new power source to other circuits thereafter.

When the AC load device uses a different frequency from that generated by the AGRF, the frequency should be converted into the one the device uses. The TLC may include this frequency converter when necessary.

FIG. 7 shows an example a PGTLS with the load at source side also.

A PGTLS can have the load $Z_S$ at the source side as in FIG. 1. An example of a PGTLS when the load is at the front-end also is in FIG. 7, where a battery or a (super) capacitor is connected through a rectifier at the source side of the TLC. In FIG. 7, when the circuit to the left of the plane crossing points A1 and A2 is converted to the Thevenin's equivalent circuit, the circuit can be analyzed in the same way as before. In this way, the power can be dissipated at the load at the source side when the power factor becomes negative.

When there is no load at the source side, the power dissipated at the load at the rear-end can be made as large as possible while the power difference $P_D$ is positive. When source side also has the load, the power dissipated at the source side and/or the rear-end side can be made large, and/or the power difference can be made large, depending upon the needs of the user. But the condition that the power difference $P_D$ is positive should be satisfied at all situations. This condition of making the power difference $P_D$ positive applies to all areas of this invention, not only to a PGTLS but also to the "self-sustaining system" described later, unless otherwise specified.

4.3 AC Generator with Right Frequency (AGRF)

In general, an AGRF generates a sinusoidal wave of a frequency. Actually, there is not just a single frequency that satisfies (Eq. 75), but some regions of continuous frequencies which make the power difference $P_D$ positive. But to make the argument simple, we explain only with a single frequency in the following.

Other forms of waves can be generated from an AGRF and a filter to select a given frequency can be attached additionally if a sinusoidal wave is desired. Therefore, in that case, it can have two parts: the first part is for generating some form of voltage wave, and the second part is to magnify only the wave of the desired frequency. One example is that the first part generates a square voltage wave, and then it is fed into, for example, a series LC filter that passes only the desired frequency with the sinusoidal form. If a sinusoidal wave is not desired, the filter can be omitted.

An AGRF can be further divided into two kinds: static and dynamic. The static kind is when the AGRF, once made for a frequency within a frequency range, does not change the frequency it generates. This is useful when the impedance of the load does not change. For instance, if the load is a battery which is not connected to other devices, then the TLC is used to charge the battery even when the power from the source is not provided on average.

4.4 (Automatic) Switching System to Charge Batteries or (Super) Capacitors

If the battery that the PGTLS charges is connected to other devices or a load that consume the power, then the impedance of the load changes, in general. In that case, either the dynamic AGRF described below is used, or more than one batteries can be used in such a way that some of the batteries are charged by the PGTLS while rest of the batteries are used for powering the devices as in FIG. 8.

FIG. 8 shows a switching system to charge a battery bank. The devices are powered by the battery bank not being charged by the PGTLS.

When one battery bank is (fully) charged, then the other battery bank is to be charged in turn, and the devices are to be powered by the (fully) charged battery bank. This can be done by using a switch which does it (automatically) by measuring the charged level of the battery bank. When the device is an AC device, then the DC from the battery can be converted into AC using an inverter. The battery here is an example of a possible source to power the devices. Others can also be used as power sources, for instance, such as a (super)capacitor. When necessary, the voltage can be adjusted in the TLC into an appropriate level so that it can charge the batteries or (super)capacitors. This (automatic) switching system for charging the battery or (super)capacitor bank is applicable to the whole areas of this invention: not only in the PGTLS but also in the "self-sustaining system" described below. This (automatic) switching system is applicable to the load at the source side also.

4.5 The Dynamic AGRF and the Monitoring Control Module

When the impedance of the load changes, it is necessary to change the frequency dynamically so that the power factor can stay the same, or the power difference $P_D$ is large enough, or the system stays at the certain condition as before the change of the impedance of the load, etc. Let the impedance of the circuit be as follows as in (Eq. 77):

$$Z(-l) = Z_T[1+\exp(-2\gamma_T l)\Gamma_L]/[1-\exp(-2\gamma_T l)\Gamma_L] = |Z(-l)|\exp(j\theta_C), \quad (Eq.\ 118)$$

where $\theta_C$ is the phase of the impedance $Z(-l)$ of the circuit.

For instance, the change in the load, and therefore the change in the phase of the circuit impedance, $\Delta\theta_C$, can be monitored by measuring some of the system variables. A "monitoring control module" is necessary in order to control the frequency dynamically.

FIG. 9 shows a PGTLS with a dynamic AGRF.

For instance, the phase of the circuit impedance, $\theta_C$, can be monitored by observing $P_S$, $v(-l)$, and $i(-l)$:

$$\theta_C = a\cos[P_S/\{v(-l)_{rms} i(-l)_{rms}\}], \quad (Eq.\ 119)$$

where subscript rms means root mean square value.

Note that in the equivalent transmission line model, the voltage and current have abstract nature at high frequencies. But despite of the abstract nature of the voltage and current, the power in the equivalent transmission line model is the same as that of the waveguide, and the phase of the circuit measured using the equation above has the correct result.

Then if there is a change in $\theta_C$, the frequency of the AGRF can be changed accordingly to satisfy some conditions related to the power or the impedances mentioned already. The new frequency with the right amplitude should be generated by the AGRF that satisfies the given condition, for instance, of the phase concerning the power difference $P_D$.

4.6 The Module to Decide the Direction and Magnitude of the Frequency Change

When there is a change in the phase $\theta_C$ or in some variables that are monitored, whether to increase or to decrease the frequency is determined by the circuit variables, such as the magnitude and the phase of the impedance of the circuit, etc. As the relative phase increases as the frequency increases, for a small change in the frequency, the change of the relative phase will be in the same direction as the change of the frequency, in general. But, as there are frequencies that do not give the positive value of the power difference, the direction of the frequency change should be carefully determined.

One of the easiest ways to decide which direction and how much the frequency should change is to use a record of the relation between the phase of the impedance of the system and the frequency. For instance, when initially setting the system, the response of the phase change to the frequency change is to be recorded at a table for the given magnitude and the phase of the impedance of the circuit or other related variables. And then the direction and the magnitude of the frequency change can be looked up at the recorded table.

One of the ways is to use a machine learning algorithm. For instance, using a neural network, the direction or the amount of the frequency to change can be trained. For example, a neural network can have input nodes for the phase and the magnitude of the impedance of the circuit or other related variables, an output node for the direction of the frequency or the amount of change of the frequency, and layers of hidden units. After trained, the neural network can be called upon whenever the monitor detects a certain change in the phase or the impedance of the circuit.

A simpler method is a "trial-and-error" method. When there is a need to change the frequency, the dynamic AGRF tries to change to a certain or an arbitrary direction of the frequency. If that direction does not give an anticipated result, then it can try the opposite direction to change the frequency. In this way, the circuit operates to generate the necessary power with the minimal or negative power at the source side.

This module that decides the direction and/or the amount of the change of the frequency can be in the "monitoring control module" in the form of software, firmware, or hardware.

4.7 When Connected to DC: A Long-Life Battery System

Let us consider the case when a DC source is connected to a PGTLS. For example, in a smartphone, there is a battery inside. If the battery is connected to the PGTLS, then the battery supplies only the power necessary to drive the AGRF, not the TLC. And the TLC can supply the power for the rest of the circuits in the smartphone. The battery can last longer as a consequence, and it becomes a long-life battery system. As mentioned already, the load of the TLC can be a battery or a (super)capacitor. Then the battery or the (super) capacitor becomes the power source to the rest of the smartphone. Also, as in FIG. 8, the (automatic) switching system to charge one battery bank while the other battery bank supplies the power to the devices can be applied in this situation.

FIG. 10 shows a long-life battery system.

4.8 When Connected to AC: A System Consuming Low Power

Let us consider the case when an AC power source is connected to a PGTLS. If the frequency of the power is not the desired one that meets the criteria making the power difference $P_D$ positive, then it is necessary to change the frequency to the desired one. It can be done by a frequency changer. For instance, a rectifier can be used to rectify AC to DC and then using the DC power, the AGRF module can generate the AC necessary for the TLC module. As already mentioned, an H-bridge, for instance, can be used for generating a necessary pulse wave. When necessary, a filter can be added to convert the pulse wave to a sinusoidal wave.

FIG. 11 shows a system that consumes low power. The example uses a rectifier as a part of the circuit to change the frequency.

Consider a utility power of 50 or 60 Hz is connected with the power generating transmission system. But the low frequency is not suitable for the PGTLS as it cannot make the power factor low or negative. Thus, if the low frequency is changed to the desired high frequency, and then the high frequency is fed to the TLC in the PGTLS, the power for electronic device(s) can be supplied by the TLC in the PGTLS. Here, the power from the power grid is used only for converting the low frequency to the high frequency in the AGRF. In that way, a system that does not consume much power can be realized, and at the same time the power that the device(s) needs is also supplied by the PGTLS.

4.9 Combining the Systems

The "static AGRF" or the "dynamic AGRF" can be combined with the "long-life battery system" or the "system that consumes low power". In other words, there are four kinds of systems:
"the long-life battery system with a PGTLS with the static AGRF,"
"the long-life battery system with a PGTLS with the dynamic AGRF"
"the system that consumes low power with a PGTLS with the static AGRF," and
"the system that consumes low power with a PGTLS with the dynamic AGRF."

Also, these systems can be cascaded together to accomplish a certain task.

And the "(automatic) switching system to charge a battery or (super)capacitor bank" can be connected to the rear-end of the TLC and/or the source side of each of the combined system to charge the battery or (super)capacitor bank.

4.10 Polyphase System

The principles and the applications mentioned so far for a single phase PGTLS can be applied in the same way to the polyphase PGTLS, as the polyphase PGTLS consists of multiple of the single phase PGTLSs.

5 Self-Sustaining System 5.1 Self-Sustaining System: A System with a Feedback

The PGTLS mentioned above has an input from an AC or a DC power source. It does not have the feedback in the system except in case of the dynamic AGRF.

When a TLC generates the electrical power more than the supplied power, the output can be used not only at the load but also be fed back to the system to form a self-sustaining system. In that case, there are two kinds of systems conceivable: a system without a power reservoir and the other kind with a power reservoir. Here, the "output" power means not only the power at the rear-end load but also including the power, if any, at the load at the source side when the power the source provides becomes negative.

5.2 A Self-Sustaining System without a Power Reservoir

For the first kind without a power reservoir, the output of the TLC is directly fed to the power source to sustain the system. As the output voltage of the TLC is fed back to the system, the output and the input voltage waves should have the same amplitude and the phase, and careful adjustment is needed not to distort the wave form.

Consider first the case when the input of the AGRF is DC. One way to make the output voltage of the TLC to the input voltage of the AGRF is, for instance, by connecting a DC-to-DC converter such as switched mode power supply to the output of the TLC when the output of the TLC is DC.

When the output of the TLC is AC, it can be converted to a DC and then DC-to-DC converter can be used. And then the output of the converter is fed back to the input of the AGRF.

One way to deal with the AGRF with AC input is to connect a DC-to-AC inverter to the output of the TLC. And then the output of the inverter is fed back to the input of the AGRF. When the input of the AGRF, for instance, is AC of utility frequency of 50 or 60 Hz, the output of the TLC is first rectified to DC in case the output of the TLC is AC, and then converted to AC having the utility frequency, and sent to the AGRF.

When there is a feedback, the phase adjustment of the output voltage of the TLC should be done not to distort the voltage signal. The phase of the output voltage is compared with that of the input of the TLC and is adjusted to have the appropriate phase before going into the AGRF. The important thing is that the wave entering the TLC should be without any phase distortion.

FIG. 12 shows a self-sustaining system without a power reservoir.

Thus, the "amplitude and phase adjustment" module in FIG. 12 does the necessary adjustment in the amplitude and the phase of the output voltage before it is fed as the input of the AGRF.

The difference between "PGTLS with the dynamic AGRF" and the "self-sustaining system without a power reservoir" is that in the "monitoring control module" of the "dynamic AGRF," although it changes the frequency according to the change of the impedance of the load of the TLC, the output wave of TLC is not fed to the AGRF, while in the "self-sustaining system without a power reservoir," as long as there is no load change, the output voltage of TLC is fed back to AGRF as an input. When there is a change in the impedance of the load, and therefore when there is a change in the magnitude and/or the phase of the circuit impedance, the "amplitude and phase adjustment" module of the "self-sustaining system without a power reservoir" should have the functions similar to those that the "monitoring control module" has. In other words, the "amplitude and phase adjustment" module monitors the change in the load situation, and should be able to adapt to a change in the load to generate a voltage wave with appropriate amplitude, phase, and frequency. Here, for convenience' sake, the "amplitude and phase adjustment" module is portrayed to include the AGRF in FIG. 12.

The power can be extracted from the self-sustaining system to power the load(s). As already mentioned, the load can be at the rear-end side of the TLC when the power difference $P_D$ is positive, and also at the source side of the TLC when the power factor is negative. This principle about the load can also be applied to the "self-sustaining system with a power reservoir" mentioned below.

To start a "self-sustaining system without a power reservoir," it is necessary to power the system using an external power supply. When the system goes into the steady state, the external power source can be cut off, and the system becomes self-sustained.

5.3 A Self-Sustaining System with a Power Reservoir

The second kind is the one with a power reservoir. A power reservoir is necessary to contain the power for the AGRF and the possible load. The output power of the TLC is used to charge the power reservoir.

FIG. 13 shows a self-sustaining system with a power reservoir.

Let us consider sequence of the processes that takes place. First, the power reservoir is to supply the power to the system. An example of the power reservoir is a battery or a (super)capacitor (bank). Then the frequency which makes the power difference $P_D$ positive is generated by the AGRF, and it is fed into the TLC. Next, the amplitude of the output voltage of the TLC is adjusted before going into the rectifier. In that way, when the output voltage is changed to DC, it can have an appropriate voltage to charge the power reservoir. This procedure to adjust the amplitude of the output voltage of the TLC can be done at this stage or later, as mentioned below, after the rectification procedure. The important thing is to adjust the amplitude of the voltage so that it can be fed into the TLC again with the right amplitude. Or after rectifying the output of the TLC, a DC-to-DC converter can be used to regulate the output voltage level to charge the power reservoir.

The DC from the rectifier goes to the reservoir. As mentioned, the amplitude of the voltage can be adjusted after the rectification. Usually there is a capacitor in the rectification circuit to remove the ripple. If the capacity of the capacitor is sufficient to function as a power reservoir, one more power reservoir does not have to be attached. Then the power reservoir in FIG. 13 can be omitted in that case.

Because the power factor can be close to zero or even negative, power can be extracted from the system for useful work.

FIG. 14 shows a self-sustaining system with a power reservoir with the monitoring control module.

The AGRF in the "self-sustaining system with a power reservoir" can have the additional function similar to those that the "monitoring control module" has. In that case, the AGRF module monitors the change in the load situation, and should be able to adapt to a change in the load to generate a voltage wave with appropriate amplitude and frequency. In that case, it has a feedback loop from the TLC to the AGRF as in FIG. 14, so that the AGRF can have the information about the load situation. Actually, as the load can be attached anywhere in the system, the feedback loop can be from any module in the system to the AGRF. In that case, the structure of the system should be changed accordingly with the right feedback loop.

5.4 The Self-Sustaining System with the (Automatic) Switching

Also, as in FIG. 8, the (automatic) switching system can be used together with the self-sustaining system to charge a battery or (super)capacitor (bank), while the other battery or (super)capacitor (bank) is used as the power source for the devices. Therefore, the "self-sustaining system" can take the place of the PGTLS in FIG. 8. As already mentioned, not only rear-end side of the TLC but also the source side can be connected to the (automatic) switching system as in FIG. 7.

5.5 Polyphase System

The principles and the applications mentioned so far can also be applied in the same way to the polyphase PGTLS, as the polyphase PGTLS consists of multiple of the single phase PGTLSs.

5.6 The Combined System

All of the systems described so far, the PGTLS and the "self-sustaining system," can be combined together to accomplish a certain task.

5.7 Excessive Power Control Module

A control module to reduce or cut the power when excessive power is generated can be inserted into a PGTLS, a "self-sustaining system," and a (combined) system. When there is excessive power, the excessive power can be diverted to a different load, such as a (variable) resistor. The (variable) resistor works as a (variable) load to absorb the excessive power. The excessive power control module can calculate the appropriate amount of the resistance for the excessive power to control the variable resistor. The module can be placed anywhere in the system. For instance, the AGRF or the TLC can have the function of the excessive power control module inside. When there is too much power coming out, then the excessive power control module can cut the circuit not to operate.

Other protective circuits such as over current protection, over temperature protection, over voltage protection, short circuit protection, surge protection, undervoltage-lockout, and voltage isolation, etc., can be additionally attached to the system.

6. Power Factor Correction in PGTLS

An AGRF module provides the necessary AC signal to the TLC. The impedance of the TLC is adjusted by controlling the amount of the phase change of the signal when the signal propagates through the transmission line.

The phase of the impedance of the TLC, which is the difference between the phase of the voltage and that of the current at the front-end of the TLC, can be adjusted so that the real power sent from the AGRF measured at the front-end of the TLC can be (close to) zero or even negative.

The reason why the magnitude of the real power sent from the AGRF becomes a small quantity is not because the amplitude of the current is minimized, but because of the difference between the phase of the voltage and that of the current.

Although the magnitude of the real power sent from the AGRF becomes a small quantity, the magnitude of the apparent power still can be large, and the AGRF needs to generate the current with a large amplitude. Therefore, the AGRF becomes unnecessarily inefficient. That is why we need a power factor correction in a PGTLS. When the power factor corrector is added, then the AGRF does not have to generate a current with a large amplitude and becomes efficient.

The power factor correction in this invention is different from the traditional power factor correction method as follows:

a) The power factor correction in this invention is to minimize the magnitude of the reactive power at the front-end of the TLC. In contrast, the traditional power factor correction in a circuit is to minimize the magnitude of the reactive power at the load at the rear-end side.

b) When the impedance of the circuit is placed at the second or the third quadrant, then the power factor correction of this invention makes the power factor to be (close to) −1 by minimizing the magnitude of the reactive power. In contrast, the traditional power factor correction is to make the power factor to be (close to) 1 by minimizing the magnitude of the reactive power.

In the electric power calculation, apparent power (S), real power (P), and reactive power (Q) have the following the relations:

$$S^2 = P^2 + Q^2 \qquad \text{(Eq. 120)}$$

When the angle between P and S is θ, the power factor is cos θ, and $$\cos \theta = P/S. \qquad \text{(Eq. 121)}$$

Also, the angle θ is the difference between the phase of the voltage and that of the current in the circuit.

In general, the traditional power factor correction is done to make the power factor large so that the magnitude of the reactive power of the load be minimized.

Let us consider an example case of traditional power factor correction in FIG. 15. Let $S_1$ and $Q_1$ be the original apparent power and reactive power before the power factor correction, respectively. Power supply provides apparent power $S_1$ in this case. Let's assume that the reactive power is changed to $Q_2$ by adding the reactive power $Q_c$ to the circuit. Then the apparent power becomes $S_2$ in that case, which is desirable as the power supply provides less apparent power, accomplishing "power factor correction."

There are ways to have the power factor corrected: passive power factor correction, active power factor correction, and dynamic power factor correction. Although all of them can be used in correcting the power factor of the TLC described in this invention, we will use the simplest one as an example to show the concept of the invention.

For instance, the simplest method is to add a passive reactive component such as a capacitor or an inductor to the circuit/system to reduce the total magnitude of the reactance. Then, the added reactive component will supply the reactive power to meet the needs of the reactive load. In this way, as the power supply does not have to provide the unnecessary reactive power to the load, the magnitude of the apparent power can be reduced.

FIG. 15 shows a power triangle. P is the real power, $Q_1$ is the original reactive power, and $S_1$ is the original apparent power before power factor correction. $Q_2$ is the new reactive power, and $S_2$ is the new apparent power after a power factor correction with reactive power of $Q_c$ added.

In an alternating current circuit, the real power is an integral of the voltage and current waves averaged over a complete cycle. If the impedance lies in the first or the fourth quadrant, the integral value always becomes non-negative, resulting in power consumption. If, however, there is a way to make the impedance lie in the second or the third quadrant, the integral value will become negative. In that case, the power factor will become negative, and the power will flow back to the source.

The derivation of the new equations of transmission line circuit, including (Eq. 77) above, allows the impedance of the TLC to be placed in the second or the third quadrant in the complex impedance plane. The impedance can be adjusted by controlling the relative phase.

One way to control the relative phase is to change the frequency feeding the TLC. Then the impedance of the TLC is controlled according to (Eq. 77).

There are many PGTLS configurations that can be constructed to utilize the impedance adjustment of the above equation. Basic configuration of a PGTLS consists of, in general, an AGRF and a TLC. There can be "monitoring control module," "amplitude and phase adjustment," and other components for necessary operation.

Although the power factor correction can be done in all of the configurations, we will use the simplest configuration to present the concept of the power factor correction in relation to the impedance adjustment of a TLC.

Let us consider a PGTLS. The load can be in the source side as well as in the rear-end side of the TLC. Although the load in the PGTLS can be at the source side as well as at the rear-end of the TLC, in the following discussion of the power factor correction, to simplify the discussion, the load mentioned is the one at the rear-end of the TLC.

The power factor correction is an established theory in the electrical engineering. The traditional power factor correction, however, deals with the case when the power factor is between 0 and 1, where impedance lies in the first or the fourth quadrant of the complex impedance plane.

In case when the phase of the impedance of a TLC is 89 degrees, for instance, then the real power becomes close to zero. The reason why it becomes a small positive quantity is not because the amplitude of the current is minimized, but because of the difference between the phase of the voltage and that of the current. Although the real power becomes a small positive quantity, the AGRF still needs to generate the current with a large amplitude. Therefore, the AGRF becomes unnecessarily inefficient. That is why we need a power factor correction in a PGTLS.

The impedance of a TLC can be placed in the second or third quadrant of the complex plane of the impedance, which makes the power factor to be negative. In that case, the real power at the front-end of the TLC becomes negative as the phase of the impedance of the TLC is over 90 degrees and less than 270 degrees.

A power factor can become negative having a value from 0 to −1 in the traditional settings, such as in case of solar panels returning the surplus power back to the supply. But in that case, when the solar panel is regarded as the power supply, then the power factor becomes positive. In contrast, in a PGTLS, however, the power factor becomes truly negative because of the phase change that occurs in the propagation of the signal in the transmission line and other factors.

FIG. 16 shows a power triangle in case when the power factor is negative.

In FIG. 16, the impedance is in the second quadrant as the real power becomes negative and the reactive load is inductive. The reactive power $Q_1$ is changed to $Q_2$ by the power factor correction. By making the magnitude of reactive power $Q_c$ of the power factor corrector equal to that of power $Q_1$, the resultant reactive power $Q_2$ becomes zero.

FIG. 17 shows an example of a PGTLS having a power factor corrector.

In FIG. 17, a block diagram of a PGTLS including the power factor corrector is shown as an example. To simplify the diagram, the optional feedback from the TLC to the AGRF is omitted as it is already explained. The power factor corrector module can be a passive one with one or more reactive component(s) added. It can be an active or dynamic power corrector in which case a feedback from the TLC might be needed to get the information about the impedance or the power of the TLC. FIG. 17 depicts the case when such a feedback is necessary.

When a feedback is necessary, the information about the impedance of the TLC can come from the front-end side of the TLC as shown in FIG. 17, and such information can include the rms voltage $v(-l)_{rms}$, the rms current $i(-l)_{rms}$, and the real power $P_S$, at the front-end of the TLC. The phase $\theta_C$ of the TLC is determined by (Eq. 119), and the magnitude $|Z(-l)|$ of the impedance of the TLC is determined as follows:

$$|Z(-l)|=v(-l)_{rms}/i(-l)_{rms}. \quad \text{(Eq. 122)}$$

The information about the phase of the TLC can come from other parts of the TLC. For instance, when we know the amount of the attenuation and the phase change that occurs when the signal propagates through the transmission line, the information from the rear-end side of the TLC can be used to calculate the impedance of the TLC at the front-end using (Eq. 77). When the feedback comes from other part, the feedback loop in FIG. 17 should be changed accordingly.

The power factor corrector can be placed in the TLC or anywhere when the information about the impedance of the TLC is gained. Therefore, the power factor corrector can be placed at the front-end side of the TLC or other places in the PGTLS.

Let us consider some cases when the power factor correction is done in a PGTLS:

1) In a PGTLS, the AGRF provides the necessary power to the TLC. Let W be the real power that the circuit of the AGRF consumes for producing the necessary waves for the TLC. W does not include the power supplied to the TLC. As the power difference is the difference between the real powers at the load at the rear-end of the TLC and that provided to the TLC measured at the front-end of the TLC, usually it is negative. It becomes, however, positive when condition such as (Eq. 75) is satisfied. If the power difference is positive, and if it satisfies the following condition, then the PGTLS as a whole produces the power:

$$(P_L-P_m)>W \quad \text{(Eq. 123)}$$

The real power of the TLC measured at the front-end of the TLC can have either positive value or negative value when the condition above is satisfied. In this case, if the reactive power becomes zero by applying the power factor correction, then the power factor becomes 1 when the real power at the front-end of the TLC has positive value, and becomes −1 when the real power at the front-end of the TLC has negative value.

2) If the impedance of the TLC lies in the second or the third quadrant, then the real power consumed by the TLC becomes negative. In this case, if the power factor correction is done to make the reactive power to zero, then the power factor becomes −1.

3) If the real power of the TLC is zero, then the power factor of the TLC becomes zero. One explanation why the real power consumed by the TLC can be zero is that the signal undergoes the phase change when it propagates through the transmission line. Although the real power is dissipated at the load at the rear-end, there is no resistance value at the front-end of the TLC because the impedance at the front-end of the TLC depends on the relative phase. In this case, when the reactive power is made zero by applying the power factor correction, the amplitude of the current that the AGRF provides can be minimized, and the efficiency is increased. An example for this case is described below.

Now, we will consider a specific example case. Although all kinds of power factor correction systems can be used for correcting the power factor of all the possible configurations of a PGTLS, we will give the simplest example to convey the idea of the invention.

Let us consider a system where the TLC is described as an equivalent circuit in FIG. 18(*a*). The impedance $Z(-l)$ of the TLC is expressed as:

$$Z(-l)=|Z(-l)|\exp\theta_C=R_C+jX_C, \quad \text{(Eq. 124)}$$

where $R_C$ and $X_C$ are the resistance and the reactance of the TLC seen at the front-end of the TLC, respectively.

FIGS. 18 (*a*) and (*b*) show an equivalent circuit of a PGTLS. FIG. 18(*a*) shows the system without the power factor correction. FIG. 18(*b*) shows a capacitor with a capacitance of C put in parallel for power factor correction of the TLC. Here, $\omega L$ and $1/(\omega C)$ are the inductive and capacitive reactances, respectively.

The phase of the impedance of the TLC can be adjusted to a desired value by controlling the relative phase. Without loss of generality, let us assume that the impedance of the TLC is in the second quadrant of the complex impedance plane. (When the impedance of the TLC is in the third quadrant, the same principle can be applied.) Then the TLC has an inductive load in addition to the negative resistive load.

Now let us assume that a capacitor is put into the circuit as in FIG. 18(*b*). Then by applying the principle of the power factor correction by reducing the magnitude of the reactive power in the TLC, the AGRF can become efficient.

An interesting case arises when the resistance $R_C$ of the impedance of the TLC is zero as mentioned in the case 3) above. Although the load at the rear-end of the TLC is a purely resistive, the phase of the impedance of the TLC can be set to 90 degrees by controlling the relative phase. Let the reactance of the capacitor be as follows in the case mentioned above:

$$1/(\omega C)=\omega L. \quad \text{(Eq. 125)}$$

Then, at the angular frequency of $\omega=1/\sqrt{LC}$, the resonance occurs, and the magnitude of the impedance of the TLC combined with the capacitor becomes very large. Then the amplitude of the current $i_b$ from the AGRF becomes very small compared with that of the current $i_a$ when the capacitor (power factor corrector) was not added. In this way, the AGRF does not have to consume much power to generate a current with large amplitude. The capacitor (power factor corrector) provides the necessary reactive power when the inductive load requires.

Instead of putting the passive reactive component for the power factor correction, other method can be used such as active or dynamic power factor correcting module. For instance, when the TLC is connected to a rectifying circuit using diodes, as the diode is a non-linear device, the active power factor correction might be useful. The above explanation using the capacitor as a passive power factor corrector is an example to show the concept of the invention.

The power factor corrector needs power to run before the PGTLS can generate power, so a standby power supply might be needed.

Although the power difference between the power at the load and the one provided by the source is positive, at certain cases, the impedance of the TLC can be placed in the first or the fourth quadrant. In that case, the same principle can be applied. Then the power factor is between 0 and 1, and the power factor correction can be done as explained in FIG. 15. But this case also is different from the traditional power factor correction in that it tries to remove the reactive power at the front-end of the TLC, not the reactive power at the load at the rear-end.

The AGRF can become efficient as it does not have to supply a current with large amplitude to the TLC when the power factor correction is applied as explained above.

Note that the power factor correction in this invention is different from the traditional power factor correction. The traditional power factor correction, when applied to a circuit, is done to minimize the magnitude of the reactive power of the load which is at the rear part of the circuit.

In this invention, however, the power factor correction is done not to minimize the magnitude of the reactive power at the load at the rear-end of the TLC, but to minimize the magnitude of the reactive power measured at the front-end of the TLC.

Also, in this invention, power factor correction is done to make the power factor be (close to) 1 or −1 depending upon the impedance of the TLC, whereas in the traditional power factor correction, it is to make the power factor be (close to) 1. Also, when the real power consumed by the TLC is zero, a resonance circuit can be made so that the amplitude of the current that the AGRF provides becomes almost zero.

7. Designing the Load

In general, by adding resistor(s) and/or reactive component(s) at the load, the phase of the impedance of the circuit can be changed. But the load is usually resistive, and it is assumed that the resistance is already fixed by the requirement of the load. Or the resistance can be determined to make the power at the load be as large as possible under the condition that the power difference becomes positive or large. Therefore, designing the load with the appropriate reactance value will help minimize the phase change to be done by changing the frequency and/or by changing the length of the transmission line. In other words, the reactive value of the load should be chosen to let the impedance of the TLC to be placed in the desired quadrant of the complex plane.

Note that the reactive value of the load changes as the frequency changes. For instance, although the load is a resistor, it manifests some capacitance and inductance as frequency goes higher. Therefore, care must be taken in designing the load.

8. Using a Material Medium Having Slower Wave Speed in the Transmission Line/Waveguide In general, the AGRF in a PGTLS generates and sends the voltage wave with right frequency to the TLC so that the relative phase can be controlled.

To get the desired phase of the impedance of the circuit, there are three ways or the combinations of the three ways to accomplish it in a given transmission line: altering the length of the transmission line and/or using different frequencies and/or adding the reactive components once the load and the medium of the transmission line circuit is determined.

The material medium used for the transmission line or the waveguide is related to the control of the relative phase also. As (Eq. 39) indicates, the relative phase is inversely proportional to the speed of the wave. The speed of the wave is related to the permeability and the permittivity of the material medium. (Reference 7: Nannapaneni N. Rao, Fundamentals of Electromagnetics for Electrical and Computer Engineering, Chapter 5, Illinois ECE Series, available on the web: https://ece.illinois.edu/webooks/nnrao2009/Rao%20 Fundamentals%202009%20full%20text.pdf) Therefore, choosing the right material as the medium of the transmission line is important if sufficient phase change is to occur when the wave propagates.

In general, as the speed of the wave becomes slower, the relative phase gets larger. If we select a material having a slower speed of the wave, when other conditions remain the same, then the relative phase will be greater. Therefore, in such a material, the same relative phase can be achieved with a lower frequency or with a shorter transmission line.

9. Dispersion and the Use of a Pulse Wave in PGTLS

Introduction of the distributed circuit model used in the transmission line theory become necessary when the wavelength of the wave propagating through the medium is comparable with the length of the transmission line. When the length of the transmission line is very short compared with the wavelength of the wave, then lumped circuit model is used instead.

When the frequency of the wave is very high, then R and G values in (Eq. 61) can be neglected, and the characteristic impedance of the transmission line becomes real. In that case, the power factor of the TLC cannot become negative. Therefore, the frequency used in the invention should not be very high to make the impedance of the transmission line real, but also should not be very low so that the transmission line model cannot be used.

As the frequency is changed from zero to higher values, there are frequencies that satisfy (Eq. 36) or (Eq. 37) for a given length of the transmission line. The shortest positive length $l_A$ of the transmission line that satisfies (Eq. 36) is related to the relative phase $\phi_A$ as follows:

$$\phi_A = \beta l_A = \pi, \quad \text{(Eq. 126)}$$

whereas the shortest positive length $l_B$ of the transmission line that satisfies (Eq. 37) is related to the relative phase $\phi_B$ as follows:

$$\phi_B = \beta l_B = \theta_0 + \pi/2 + k_B \pi, \quad \text{(Eq. 127)}$$

where $k_B$ is an integer that makes the minimum positive value of $l_B$.

Between the values $l_A$ and $l_B$ of the length of the transmission line, the smaller value is chosen to be $l_0$. If, for instance, $l_0$ is found by (Eq. 126), then the length $l_0$ is the half of the wavelength of the wave.

As there is a frequency that makes the power difference become zero at the length of $l_0$, there is a frequency region where power difference becomes positive somewhere around the length of $l_0$. Therefore, the length of the transmission line can be in the order of magnitude of the length of $l_0$.

The velocity described in (Eq. 39) is phase velocity. When a wave with two or more frequency components propagates in a transmission line, there is dispersion. A pulse, for instance, consists of many frequency components, and therefore when a pulse wave propagates through a transmission line, the shape of the pulse gets dispersed. When a wave consists of many different frequency components around a central frequency, the peak of the pulse propagates with the group velocity. (Reference 8: Nannapaneni N. Rao, Fundamentals of Electromagnetics for Electrical and Computer Engineering, Chapter 8, Illinois ECE Series, available on the web: https://ece.illinois.edu/webooks/nnrao2009/Rao%20 Fundamentals %202009%20full%20text.pdf)

When a pulse wave gets dispersed in the medium, even if it has many different frequency components, the degree of distortion of the shape can be tolerable if the length of the transmission line is not long, as what we are concerned is not the conservation of the exact shape of the waves, but the power which is related to the multiplication of the voltage and current waves. Although the waves get some distortion, when the voltage and current waves are multiplied and integrated together, there still can be negative values coming out as a result on average. Therefore, even if a pulse wave is used as the signal, the equivalent transmission line circuit can generate the power. If desired, a filter can be used to remove the high frequency components of the pulse wave.

The power factor correction mentioned above can be done when the wave is not sinusoidal. For instance, by using the difference of the phase of the voltage wave and that of the current wave of the fundamental frequency or by measuring the real power and the apparent power as in (Eq. 121), the power factor can be calculated and the principles of the power factor correction can be applied.

10. The Path for the Power to Return to the Power Source

FIG. 19 shows a PGTLS with switching part of the AGRF in the form of H-bridge.

When the power flows back to the power source, to utilize the power, the path for the power to return to the power source needs to be made. (Reference 9: E. Acha, V. G. Agelidis, Anaya-Lara, and T. J. E. Miller, Power electronic control in electrical systems, Newnes, 2002. p. 201.) For instance, let us consider the case when part of the AGRF in a PGTLS is in the form of H-bridge and is connected to the TLC as in FIG. 19. Here, switches of H-bridge consist of transistors Q1 to Q4. Note that Q1 here is different from Q1 of the "original reactive power" in FIGS. 15 and 16.

When Q1 and Q4 are on and Q2 and Q3 are off, current i can flow from the source to the TLC in the forward direction or from the TLC to the source in the backward direction. When the current flows from the TLC to the source, diodes D1 and D4 are necessary to make the path for the current to flow in the backward direction.

Now, when Q2 and Q3 are on and Q1 and Q4 are off, current i can flow from the source to the TLC or from the TLC to the source. When the current flows from the TLC to the source, diodes D2 and D3 are necessary to make the path for the current to flow. When the power factor of the TLC has negative value, the power flows in the backward direction on average, and by making the return path for the current in this way, the power coming backward can be utilized.

Therefore, when making a PGTLS, the return current path needs to be made so that the power can flow backward.

11. PGTLS as an Efficient Power Supply

When (Eq. 123) is satisfied, a PGTLS becomes a power generator. Although (Eq. 123) is not satisfied, by controlling the relative phase, the impedance of the TLC can be adjusted so that the PGTLS can function as an efficient power supply.

The power $P_n$ the AGRF needs to supply power to the TLC is:

$$P_n = P_m + W. \quad \text{(Eq. 128)}$$

At a certain frequency $f_0$, when the power is generated, the following is true:

$$P_L(f_0) - P_n(f_0) > 0, \quad \text{(Eq. 129)}$$

where $P_L(f_0)$ represent the power at the load and $P_n(f_0)$ is the power $P_n$ at the frequency $f_0$.

Let us assume that at frequencies $f_1$ and $f_2$, the power is not generated. Then the following relations hold:

$$P_L(f_1) - P_n(f_1) = P_A < 0, \quad \text{(Eq. 130)}$$

$$P_L(f_2) - P_n(f_2) = P_B < 0. \quad \text{(Eq. 131)}$$

Without loss of generality, let us assume the following:

$$P_A < P_B. \quad \text{(Eq. 132)}$$

Then, $$[P_L(f_2) - P_L(f_1)] - [P_n(f_2) - P_n(f_1)] = P_B - P_A > 0, \quad \text{(Eq. 133)}$$

$$\Delta P_L = [P_L(f_2) - P_L(f_1)] > [P_n(f_2) - P_n(f_1)] = \Delta P_n. \quad \text{(Eq. 134)}$$

Let us further assume that the followings are true:

$$P_L(f_2) > P_L(f_1), \quad \text{(Eq. 135)}$$

$$P_n(f_2) > P_n(f_1) > 0. \quad \text{(Eq. 136)}$$

Then, (Eq. 134) says that when frequency changes from $f_1$ to $f_2$, the difference $\Delta P_L$ of the powers at the frequency $f_1$ and at $f_2$ at the load becomes larger than the difference $\Delta P_n$ of the powers that the AGRF needs to provide the power to the TLC. This is possible because the impedance is adjusted by controlling the relative phase. In this way, the PGTLS can function as an efficient power supply.

12. Power Factor Correction in PGTLS as an Efficient Power Supply

In the extended application of PGTLS as an efficient power supply, the same principle mentioned above for the power factor correction can be applied to reduce the magnitude of the reactive power that AGRF supplies, thereby making it more efficient.

13. Transformer Circuit as the Load

The load can be any electric circuit and can include a transformer.

FIG. 20 shows a transmission line circuit with a transformer circuit as the load.

Let us consider a single phase transformer circuit connected as a load in the TLC as in FIG. 20, where $v_1$ and $v_2$ are the voltages at the primary coil and the secondary coil, respectively; $i_1$ and $i_2$ are the currents of the primary circuit and the secondary circuit, respectively; $L_1$ and $L_2$ are the self-inductances of the primary and the secondary windings, respectively; M is the mutual inductance; and $Z_2$ is the impedance of the load at the secondary circuit of the transformer.

Then it is shown that the impedance $Z_M$ of the transformer circuit is: (Reference 1: Won Don Lee, Hijung Chai, and Aquila Hwan Lee, Power factor adjustment method and apparatus through the phase control, PCT International application #: PCT/KR2017/014540.)

$$Z_M = v_1/i_1 = j\omega L_1 + \exp(-2\gamma_M l_M)\omega^2 M^2 / (j\omega L_2 + Z_2) = \quad \text{(Eq. 137)}$$
$$j\omega L_1 + \exp(-2\alpha_M l_M)\exp(-2j\phi_M)\omega^2 M^2 / (j\omega L_2 + Z_2),$$

where $l_M$ is the length of the magnetic core from the primary coil to the secondary coil of the transformer core, and $\gamma_M$ is the propagation constant of the magnetic flux in the magnetic core of the transformer:

$$\gamma_M = \alpha_M + j\beta_M, \quad \text{(Eq. 138)}$$

where $\alpha_M$, $\beta_M$ are the attenuation constant and the phase constant of the magnetic flux, respectively, and $\phi_M$ is related to $\beta_M$ as follows:

$$\phi_M = \beta_M l_M = 2\pi f l_M/v_M, \quad \text{(Eq. 139)}$$

where $v_M$ is the speed of the magnetic flux in the magnetic core of the transformer. Since the transformer is the load of the TLC, the frequency f used is the same as the frequency in the TLC provided by the AGRF.

Then the impedance $Z(-l)$ of the whole the TLC becomes:

$$Z(l)=Z_T[1+\exp(-2\gamma_T l)\Gamma_{LT}]/[1-\exp(-2\gamma_T l)\Gamma_{LT}], \quad \text{(Eq. 140)}$$

where $\Gamma_{LT}$ is:

$$\Gamma_{LT}=(Z_M-Z_T)/(Z_M+Z_T)=(Z_M/Z_T-1)/(Z_M/Z_T+1). \quad \text{(Eq. 141)}$$

It is also shown that the impedance $Z_M$ of the transformer circuit can be placed in the second or the third quadrant of the complex plane of the impedance when a certain condition is met. (Reference 1: Won Don Lee, Hijung Chai, and Aquila Hwan Lee, Power factor adjustment method and apparatus through the phase control, PCT International application #: PCT/KR2017/014540.)

Let us assume that the impedance of the transformer circuit is in the second or third quadrant, and let $$Z_M/Z_T = g+jh, \quad \text{(Eq. 142)}$$

where g and h are the real and imaginary part of $Z_M/Z_T$. Then, $$g<0, \quad \text{(Eq. 143)}$$

$$|\Gamma_L|=|(g-1+jh)/(g+1+jh)|=\sqrt{(g-1)^2+h^2}/\sqrt{(g+1)^2+h^2}>1. \quad \text{(Eq. 144)}$$

As already discussed, when the magnitude $|\Gamma_L|$ of the reflection coefficient is larger than 1, if we neglect the attenuation, the impedance of the TLC can have any value from $-\pi$ to $\pi$ by controlling the relative phase. Therefore, combining the TLC with a transformer circuit as a load can be beneficial in some cases.

14. Antenna as the Load

An antenna can be the load of a TLC. In that case, the transmission line of the TLC is used to deliver the power from the AGRF to the load antenna, and the characteristic impedance of the transmission line and the impedance of the antenna determines the reflection coefficient $\Gamma_L$. In that way, power or signal can be delivered wirelessly from the load antenna of the TLC to the receiving antenna at another place. Traditionally, the impedance of the load antenna is to be matched with that of the transmission line. But in this invention, it should not be matched so that the waves can be reflected from the load antenna back to the source through the transmission line. In that way, the power can be generated by making the power factor be negative, or by making the power difference between the power dissipated at the load antenna and that provided by the source be positive. This is a system delivering power wirelessly while generating power at the same time.

15. Multiport Configuration

The derivation and principles described in this invention can be easily extended to a multiport network of a transmission line network or a waveguide network. All of the already established principles in the area can be used under the condition that the characteristic impedance of the transmission line being not real when calculating the power.

16. Block Diagrams of a PGTLS without Feedback

Below, some block diagrams of power generating transmission line systems (PGTLSs) are shown, and the way to control the power as the impedance of the load changes is described.

As the impedance of the load changes, the power delivered to the load should be changed accordingly to meet the needs of the load. To control the power that a PGTLS provides, the frequency or the duty cycle of the wave should be adjusted by the "monitoring control module" dynamically according to the change of the impedance of the load. The method of changing the duty cycle by pulse-width modulation (PWM) or the frequency by pulse-frequency modulation (PFM) of the pulse wave is explained in the following sections.

The "monitoring control module" to change the frequency or the duty cycle of the wave to control the power that the PGTLS provides can be placed before or after the transmission line. If the module is placed after the transmission line, the relative phase does not change although the frequency in the module changes, because the relative phase changes according to the frequency of the wave that propagates through the transmission line generated by the AGRF. Note that the frequency of the wave generated by the AGRF is different from that of the control signal of the "monitoring control module." If, however, the module is placed before the transmission line, then the phase of the wave that propagates through the transmission line changes accordingly as the frequency changes, as the frequency of the wave generated by the AGRF is the same as that of the control signal of the "monitoring control module."

In the section "4.5 The Dynamic AGRF and the monitoring control module," the method of changing the frequency of the AGRF by the "monitoring control module" placed before the transmission line is discussed. The duty cycle of the wave is fixed in that case.

In the following sections, not only the method of changing the frequency, but also the method of changing the duty cycle of the wave by the "monitoring control module" to meet the power needed at the load is discussed. The "monitoring control module" can be placed before or after the transmission line.

A PGTLS consists of an "AC generator with right frequency (AGRF)" and a "transmission line circuit (TLC)" as shown in FIG. 6. An AGRF consists of a "signal generator" and an "amplifier." In the AGRF module, the signal generated by the "signal generator" is amplified by the "amplifier," and the wave with the right frequency to have the necessary phase change in the transmission line (from now on, the transmission line in the TLC is denoted as "TRAN") is generated. A TLC consists of a TRAN and a "rectifier and filter" module, and a load. Here, it is assumed that the load requires a DC power. If the load requires an AC power, then an inverter is necessary to convert DC to AC with an appropriate frequency. The wave generated by the AGRF undergoes a phase change in the TRAN in the PGTLS. Therefore, the TRAN in this invention is the transmission line with a sufficient length to accomplish the necessary phase change of the wave.

FIG. 21 shows a block diagram of a power generating transmission line system (PGTLS).

A block diagram for a PGTLS can be drawn to consist of a "signal generator," an "amplifier," a "TRAN," a "rectifier and filter," and a "load" as shown in FIG. 21.

A reactive component(s) may be inserted before or after the TRAN in FIG. 21 to get the desired phase of the impedance of the circuit. Throughout the invention, however, the reactive component(s) for changing the phase of the impedance of the circuit is omitted in the diagrams for the sake of simplicity. Also, the input voltage and the signal ground are omitted for the sake of simplicity in FIG. 21.

FIG. 22 shows a block diagram of a PGTLS without feedback.

A more detailed block diagram of a PGTLS is depicted in FIG. 22. From now on, the block diagrams are drawn with lines without arrows as the directions of the flows between modules are apparent. In this invention, it is assumed that the signal generator, the amplifier and the load are DC powered, and $V_{IN}$ in FIG. 22 is the input DC voltage. The input voltage $V_{IN}$ can be, for instance, provided by a battery or by a hand crank generator or by the power grid through rectification. Not only the amplifier needs input voltage $V_{IN}$, but also the signal generator needs input voltage which can be different from $V_{IN}$. When the voltage the signal generator needs is different from $V_{IN}$, the voltage should be adjusted to an appropriate level in the signal generator.

If only an AC source is available as input, converting AC to DC can be done easily through the rectification process. Illustration of the necessary rectification module is omitted for the sake of simplicity. Likewise, if any module needs an AC source, then converting DC to AC can be done by a power inverter. The necessary power inverter in such case is omitted in the block diagrams for the sake of simplicity.

In the following discussion, each module in FIG. 22 is described from the left to the right.

16.1 Signal Generator

The signal generator generates a periodic signal such as, for instance, a sinusoidal or a pulse wave with the right frequency. When a wave consists of some different frequencies, there is a dispersion. When a wave is dispersed in the medium, the degree of distortion of the shape of the wave can be tolerable if the length of the TRAN in the PGTLS is not long. This is because the matter of concern is not the conservation of the exact shape of the waves, but the power which is related to the multiplication of the voltage and the current waves.

Although the waves get some distortion, when the voltage and the current waves are multiplied and integrated together, there still can be negative power values coming out as a result on average. Therefore, even if a pulse wave is used as the signal, the PGTLS can generate power. If desired, a filter can be used to remove the high frequency components of the pulse wave.

16.2 Amplifier

The amplifier amplifies the signal generated from the signal generator. Any amplifier that amplifies the incoming signal can be used, but it is better to use an efficient one. For instance, a class-D amplifier has a theoretical power efficiency of 100%. (Reference 10: Jun Honda and Jonathan Adams, Class D audio amplifier basics, Application note AN-1071, International Rectifier, 2005.)

Among the many configurations, a specific type of the class-D amplifier has a half-bridge or a full-bridge (H-bridge) configuration. In the block diagrams in this invention, a half-bridge or a full-bridge is used as the amplifier as an example. Note, however, that any amplifier regardless of the class can be used here if it is an efficient one.

A PGTLS can be implemented even with an inefficient amplifier. For instance, as already discussed in relation to FIG. 18(b), the apparent power provided from the AGRF can be very small when the power factor corrector is attached. Therefore, although the amplifier is inefficient, the PGTLS can be realized with it.

16.3 Filter

If the output of the amplifier needs to be sinusoidal or if some of the unwanted frequency needs to be removed, a filter is added after the amplifier as shown in FIG. 22. However, as the output of the amplifier does not need to be sinusoidal, this filter may be omitted.

16.4 Power Factor Corrector

The power factor correction in PGTLS is already explained above. If an active power factor corrector is used, for instance, then the input power supply needs to be connected to the power factor corrector also. The power factor corrector is added when desired, and hence, is optional.

16.5 TRAN

As mentioned already, the TRAN has a sufficient length to accomplish the phase change. The powers delivered from the source and to the load are proportional to the square of the amplitude of the transmitted voltage wave as shown in (Eq. 63) and (Eq. 64). Once the impedances of the TRAN and the load are determined, the amplitude of the transmitted voltage can be maximized by adjusting the frequency and the impedance Z s of the source side as can be seen in (Eq. 52).

16.6 Rectifier and Filter

The output of the TRAN is an AC wave, and needs to be rectified and filtered to convert AC to DC. Examples of the rectifier and the filter are a bridge rectifier and a capacitor, respectively.

16.7 DC-to-DC Converter

A DC-to-DC converter is needed after rectification and filtering are completed as the voltage should be adjusted to the level that the load requires. If the impedance of the load stays constant over time and if the output voltage of the "rectifier and filter" is the voltage that the load requires, then this DC-to-DC converter can be omitted.

An example of a DC-to-DC converter is the switched-mode power supply (SMPS). (Reference 11: Mohammad Kamil, AN1114, Switch Mode Power Supply (SMPS) Topologies (Part I), Microchip Technology Inc., 2017.) Other regulators such as Zener diode, linear regulators, etc., can also be used. Or more than one method can be combined to regulate the voltage.

In the examples of the block diagrams, an SMPS is used as the DC-to-DC converter as an example. There are many topologies of the SMPS, and any of them can be used if the SMPS gives out the output voltage that the load requires. Even a commercially available off-the-shelf DC-to-DC converter or an SMPS product can be used.

FIG. 23 shows a block diagram of an SMPS with a transformer.

FIG. 23 shows a block diagram of an SMPS with a transformer. In an SMPS, the voltage or the current in the circuit is monitored to regulate the output power. In the example of the SMPS in FIG. 23, the control unit monitors the output voltage of the "rectifier and filter" to generate the modulated control signal.

FIG. 24 shows a block diagram of a PWM control unit of an SMPS using pulse-width modulation (PWM).

In FIG. 24, a PWM control unit of an SMPS using pulse-width modulation (PWM) is shown. There are various ways of implementing the control unit.

Another kind of modulation method, pulse-frequency modulation (PFM), for instance, can be used in the control unit. There are two kinds of PFM control: the one kind is when the on-time is fixed while the off-time is varied and the other kind is when the off-time is fixed while the on-time is varied.

In the PWM control, as the duty cycle changes, the on/off time ratio of the pulse changes.

In case when the voltage in the circuit is monitored to regulate the output power, for instance, the output voltage is sensed by the output sensor and is compared with the reference voltage. Then the error is amplified by the error amplifier. Next, after the electric isolation, the input DC is changed to a chopped high frequency signal through the high frequency switch which is switched by the PWM signal generator. An optocoupler, for instance, is used for the isolator.

The duty cycle of the PWM signal is controlled according to the changes in the impedance of the load so that the required power is transferred to the output. The SMPS has the function of the "monitoring control module" described in the section 4.5 as the SMPS controls the power delivered to the load according to the change of the impedance of the load. Therefore, the PWM (or PFM) control unit of the SMPS placed after the TRAN of the PGTLS corresponds to the "monitoring control module" of the PGTLS to control the power delivered to the load.

Since the SMPS is placed after the TRAN, and since the frequency of the PWM signal is different from that of the AGRF, the duty cycle increases/decreases as the power to be delivered increases/decreases.

Likewise, when PFM with the fixed on-time is used in the control unit, for instance, the length of the time it takes for the next pulse to come varies accordingly to meet the need of the power consumed at the load, and the number of on-time increases/decreases as the power to be delivered increases/decreases.

Some desirable features such as over current protection, over temperature protection, over voltage protection, short circuit protection, surge protection, undervoltage-lockout, and voltage isolation, etc., which are readily available in the commercial off-the-shelf SMPS products, can be inserted in the DC-to-DC converter of the PGTLS.

16.8 Load

The load dissipates power out of the DC-to-DC converter.

The PGTLS described in FIG. 22 does not have a feedback loop from the output of the TLC back to the system. The PGTLS without feedback shown above corresponds to the "long-life battery system" when the input is from a battery as described earlier in the section "4.7 When connected to DC: a long-life battery system."

FIG. 25 shows an example of a block diagram of a PGTLS without feedback with a half-bridge or a full-bridge as the amplifier and with an SMPS as the DC-to-DC converter.

FIG. 25 shows an example of a block diagram of a PGTLS without a feedback loop with a half-bridge or a full-bridge as the amplifier and with an SMPS as the DC-to-DC converter.

FIG. 26 shows a full-bridge connected to a TRAN.

FIG. 26 shows a full-bridge connected to a TRAN. The signal generator generates two pulse waves, p1 and p2, in FIG. 25. When p1 is high, the transistors Q1 and Q4 in FIG. 26 are on, while Q2 and Q3 are off. When p2 is high, the transistors Q2 and Q3 are on, while Q1 and Q4 are off. Pulse waves p1 and p2 should be carefully generated not to cause a shoot-through which takes place when either both Q1 and Q2 or both Q3 and Q4 are on at the same time.

Points A and B in FIG. 25 corresponds to the points A and B in FIG. 26, respectively. In FIG. 26, only the two input terminals of the TRAN are shown, and the output terminals of the TRAN are not shown.

It is better to use an SMPS with an isolated topology as the DC-to-DC converter when a half-bridge or a full-bridge is used. This is because the ground of the primary side of the TRAN is different from that of the secondary side of the TRAN. Usually a transformer is used for the isolation in an SMPS. By using an isolated SMPS, the ground of the load can be connected to the ground of the signal generator or the amplifier which is a half-bridge or a full-bridge in this case. The ground connections are illustrated in FIG. 25 for clarification.

17. Block Diagrams of a PGTLS with Feedback

FIG. 27 shows a block diagram of a PGTLS with feedback.

FIG. 27 shows a block diagram of a PGTLS with a feedback loop. In the diagram, the signal ground is omitted for the sake of convenience. The output of the DC-to-DC converter is fed back to the amplifier. The output of the DC-to-DC converter should also be connected to any module that needs power. For instance, if an active power factor corrector is used, then the output needs to be connected to the power factor corrector as well.

In the feedback loop, to prevent power from flowing in the reverse direction from the source to the DC-to-DC converter, a diode, for instance, may be inserted. In such a case, the output voltage of the DC-to-DC converter is $V_{IN}$ plus the diode forward voltage. The diode is omitted in FIG. 27.

If the impedance of the load stays constant over time, and if the output voltage of the "rectifier and filter" is equal to $V_{IN}$ when the diode is not inserted and if it is equal to the voltage the load requires, then the DC-to-DC converter can be omitted, and in that case, the feedback loop forms from the output of the "rectifier and filter" to the amplifier.

As mentioned in the section "5.3 A self-sustaining system with a power reservoir," the capacitor in the "rectifier and filter" can function as a power reservoir. In the following block diagrams of PGTLS, the power reservoir is omitted for the sake of simplicity.

To start the PGTLS, the switch is turned on momentarily to initiate the system. After power circulates through the feedback loop, the switch is turned off and the system continues to generate power.

FIG. 28 shows an example of a block diagram of a PGTLS with feedback with a half-bridge or a full-bridge as the amplifier and with an SMPS as the DC-to-DC converter.

FIG. 28 shows an example of a block diagram of a PGTLS with feedback with a half-bridge or a full-bridge as the amplifier and with an SMPS as the DC-to-DC converter. The feedback loop forms from the output of the SMPS to the amplifier (a half-bridge or a full-bridge).

The power to be delivered is controlled by the SMPS in the same way described in the section 16.7. The SMPS has the function of the "monitoring control module" described in the section 4.5. Therefore, the control unit of the SMPS placed after the TRAN of the PGTLS corresponds to the "monitoring control module" of the PGTLS.

When PWM is used in the control unit, the duty cycle of the PWM signal increases/decreases as the power to be delivered increases/decreases. When PFM with the fixed on-time is used in the control unit, the length of the time it takes for the next pulse to come varies accordingly to meet the need of the power consumed at the load, and the number of on-time increases/decreases as the power to be delivered increases/decreases.

18. Simplified Block Diagrams of PGTLS

Note that the PWM (or PFM) control unit of the SMPS in FIG. 24 generates a high frequency signal just as the signal generator in FIG. 22 does. Also, the high frequency switch in FIG. 23 functions in the same way as the amplifier in FIG. 22 does. Therefore, the block diagram in FIG. 22 can be reduced to a simpler one when the modules with the same function are merged.

FIG. 29 shows a simplified block diagram of a PGTLS without feedback.

FIG. 29 shows a simplified block diagram of a PGTLS without feedback where the control unit of the SMPS is used as the signal generator generating a pulse train with varying duty cycles as the impedance of the load varies. Therefore, the control unit corresponds to the signal generator combined with the "monitoring control module" of the PGTLS.

The optional "filter" and the "power factor corrector" in FIG. 22 are omitted for the sake of simplicity in FIG. 29. Note that FIG. 29 illustrates a system with feedback from the output to the control unit, but this is classified as a system without feedback because the output power is not used to power the system through a feedback loop. Therefore, when the "filter" and the "power factor corrector" are removed, the block diagram of FIG. 22 can be reduced to a simplified block diagram in FIG. 29.

Note that the simplified block diagram of a PGTLS without feedback in FIG. 29 is the same as the block diagram of an SMPS that uses a transformer as shown in FIG. 23 if the TRAN in FIG. 29 is replaced by a transformer. Therefore, some desirable features such as over current protection, over temperature protection, over voltage protection, short circuit protection, surge protection, undervoltage-lockout, and voltage isolation, etc., which are readily available in the commercial off-the-shelf SMPS products, can be inserted in the PGTLS.

FIG. 30 shows a simplified block diagram of a PGTLS without feedback that uses a half-bridge or a full-bridge amplifier.

FIG. 30 shows a simplified block diagram of a PGTLS without feedback that uses a half-bridge or a full-bridge amplifier. In FIG. 30, the PWM control unit generates the PWM pulses that switch the half-bridge or the full-bridge.

FIG. 31 shows a simplified block diagram of a PGTLS with feedback.

FIG. 31 shows a simplified block diagram of a PGTLS with feedback. When the "filter" and the "power factor corrector" are removed, the block diagram of FIG. 27 can be reduced to a simplified block diagram of FIG. 31. When the output voltage cannot reach $V_{IN}$, a voltage converter might be necessary. The voltage converter is an AC-to-AC converter in this case when it is inserted before or right after TRAN. When the voltage is adjusted after the "rectifier and filter," the voltage converter is a DC-to-DC converter.

FIG. 32 shows a simplified block diagram of a PGTLS with feedback with a voltage converter.

FIG. 32 shows a simplified block diagram of a PGTLS with feedback with a voltage converter. A transformer can be used as the voltage converter in this case. The transformer can be a usual transformer without having a long magnetic core, or can be a transformer having a long magnetic core. When a transformer with a long magnetic core is used as the voltage converter, not only the magnitude but also the phase of the wave through the PGTLS is affected by the attenuation and the phase change occurred in the transformer as explained in the document of PCT international patent application #PCT/KR2017/014540.

FIG. 33 shows a simplified block diagram of a PGTLS with feedback with a half-bridge or a full-bridge amplifier.

FIG. 33 shows a simplified block diagram of a PGTLS with feedback with a half-bridge or a full-bridge amplifier. When the "filter" and the "power factor corrector" are removed, the block diagram of FIG. 28 can be reduced to a simplified block diagram of FIG. 33.

In the simplified block diagrams of a PGTLS, the phase of the wave through the TRAN changes according to the frequency of the control unit. As the relative phase increases as the frequency increases, for a small change in the frequency, the change of the relative phase will be in the same direction as the change of the frequency, in general. But, as there are frequencies that do not give the positive value of the power difference, the direction of the frequency change should be carefully determined.

When PWM is used in the control unit, the duty cycle of the PWM signal increases/decreases as the power to be delivered increases/decreases. When PFM with the fixed on-time is used in the control unit, the length of the time it takes for the next pulse to come varies accordingly to meet the need of the power consumed at the load, and the number of on-time increases/decreases as the power to be delivered increases/decreases.

Each control unit in FIGS. 29 through 33 not only functions as the "monitoring control module", but also include the function of the signal generator of a PGTLS. Therefore, when the PWM (or PFM) control unit is placed before the TRAN and is connected to the amplifier (high frequency switch), the control unit corresponds to the signal generator combined with the "monitoring control module" of the PGTLS.

Overall, the "monitoring control module" of a PGTLS can be placed before or after the TRAN and can change the frequency through PFM or the duty cycle through PWM of the wave to control the power to be delivered to the load. Note that when the "monitoring control module" is placed after the TRAN, the PWM (or PFM) control signal is different from the wave generated by the signal generator of the AGRF.

While the disclosure has been particularly shown and described with reference to embodiments thereof, it will be understood by one of ordinary skill in the art that various changes in form and details may be made therein without departing from the spirit and scope of the disclosure as defined by the appended claims. The embodiments should be considered in descriptive sense only and not for purposes of limitation. Therefore, the scope of the disclosure is defined not by the detailed description of the disclosure but by the appended claims, and all differences within the scope will be construed as being included in the disclosure.

The invention claimed is:

1. A power generating transmission line system comprising:
    a transmission line circuit or a waveguide circuit which can be converted to an equivalent transmission line circuit; and
    an AGRF configured to generate an alternating voltage wave and to control power supplied by a source by adjusting a relative phase based on a frequency of the alternating voltage wave, wherein the relative phase is a magnitude of a phase change that the alternating voltage wave undergoes in a waveguide or a transmission line.

2. The power generating transmission line system of claim 1, further comprising:
A power factor corrector configured to control a power factor at a front-end of the waveguide circuit or the transmission line circuit using one or more components located in the waveguide circuit or the transmission line circuit.

3. The power generating transmission line system of claim 2, wherein the power factor corrector controls the power factor at the front-end of the waveguide circuit or the transmission line circuit to be (close to) −1 when an impedance of the circuit is placed in second quadrant or third quadrant of a complex plane of the impedance, or to be (close to) 1 when the impedance of the circuit is placed in first or fourth quadrant, or to be 0 when a resistance of the impedance of the circuit is zero, by minimizing a magnitude of a reactive power.

4. The power generating transmission line system of claim 1, wherein power supplied by the source of the (equivalent) transmission line circuit is determined by a characteristic impedance of the (equivalent) transmission line, an impedance of a load, the relative phase, an attenuation of the alternating voltage wave when the alternating voltage wave propagates through a medium of the waveguide or the transmission line, and an amplitude of the alternating voltage wave transmitted from the source.

5. The power generating transmission line system of claim 1, wherein an impedance of the (equivalent) transmission line circuit is determined by a characteristic impedance of the (equivalent) transmission line, an impedance of the load, the relative phase, and an attenuation of the alternating voltage wave when the alternating voltage wave propagates through a medium of the waveguide or the transmission line.

6. The power generating transmission line system of claim 1, wherein the relative phase is controlled by the frequency and/or a length of the waveguide or the transmission line, and/or a propagation speed of the alternating voltage wave in the medium of the waveguide or the transmission line.

7. The power generating transmission line system of claim 1, further comprising a monitoring control module configured to control a power delivered to the load by monitoring a change of the impedance of the load.

8. The power generating transmission line system of claim 1, wherein the alternating voltage wave comprises one or more frequency components and the AGRF adjusts one or more relative phases based on the one or more frequency components of the alternating voltage wave.

9. A power factor adjustment method, comprising:
generating, by an AGRF, an alternating voltage wave; and
controlling, by the AGRF, power supplied by a source by adjusting a relative phase based on a frequency of the alternating voltage wave, wherein the relative phase is a magnitude of a phase change that the alternating voltage wave undergoes in a waveguide or a transmission line.

10. The power factor adjustment method of claim 9, further comprising:
controlling, by a power factor corrector, a power factor at a front-end of a waveguide circuit or a transmission line circuit using one or more components located in the waveguide circuit or the transmission line circuit.

11. The power factor adjustment method of claim 10, wherein the controlling the power factor comprising:
controlling, by the power factor corrector, the power factor at the front-end of the waveguide circuit or the transmission line circuit to be (close to) −1 when an impedance of the circuit is placed in second quadrant or third quadrant of a complex plane of the impedance, or to be (close to) 1 when the impedance of the circuit is placed in first or fourth quadrant, or to be 0 when a resistance of the impedance of the circuit is zero, by minimizing a magnitude of a reactive power.

12. The power factor adjustment method of claim 9, wherein the relative phase is controlled by the frequency and/or a length of the waveguide or the transmission line, and/or a propagation speed of the alternating voltage wave in the medium of the waveguide or the transmission line.

13. The power factor adjustment method of claim 9, further comprising:
monitoring, by a monitoring control module, a change of the impedance of the load; and controlling, by the AGRF, the relative phase as the load changes dynamically.

14. A power control method of a power generating transmission line system, the method comprising:
monitoring, by a monitoring control module, a change of an impedance of a load; and
controlling, by an AGRF, a power delivered to the load according to the change of the impedance of the load, wherein the power delivered to the load is controlled through a relative phase by a change of a frequency, pulse-width modulation, or pulse-frequency modulation.

* * * * *